United States Patent
Tanimura et al.

(10) Patent No.: US 11,858,414 B2
(45) Date of Patent: Jan. 2, 2024

(54) ATTENTION CALLING DEVICE, ATTENTION CALLING METHOD, AND COMPUTER-READABLE MEDIUM

(71) Applicant: Panasonic Intellectual Property Management Co., Ltd., Osaka (JP)

(72) Inventors: Naoya Tanimura, Kanagawa Ken (JP); Akito Sakamoto, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 69 days.

(21) Appl. No.: 17/542,027

(22) Filed: Dec. 3, 2021

(65) Prior Publication Data
US 2022/0203888 A1 Jun. 30, 2022

(30) Foreign Application Priority Data

Dec. 24, 2020 (JP) .................. 2020-215085
Dec. 24, 2020 (JP) .................. 2020-215745

(51) Int. Cl.
*B60Q 1/26* (2006.01)
*B60Q 1/50* (2006.01)
(Continued)

(52) U.S. Cl.
CPC ............. *B60Q 1/535* (2022.05); *B60Q 1/085* (2013.01); *B60W 30/0956* (2013.01);
(Continued)

(58) Field of Classification Search
CPC .... B60Q 1/525; B60Q 1/085; B60Q 2300/45; B60Q 1/46; B60Q 1/535; B60W 30/0956;
(Continued)

(56) References Cited

U.S. PATENT DOCUMENTS 7,791,458 B2 * 9/2010 Shimaoka .............. B60Q 1/085
348/148
7,791,459 B2 * 9/2010 Teramura ............... B60Q 1/085
362/40
(Continued)

FOREIGN PATENT DOCUMENTS

CN 112078475 A * 12/2020 .............. B60Q 1/08
DE 102017206690 A1 * 10/2018 ............. B60Q 1/245
(Continued)

*Primary Examiner* — Toan N Pham
(74) *Attorney, Agent, or Firm* — Greenblum & Bernstein, P.L.C.

(57) ABSTRACT

An attention calling device includes a memory and a hardware processor coupled to the memory. The hardware processor is configured to: acquire information regarding obstacles around a moving object detected by a sensor included in the moving object; calculate a potential risk that is a degree to which attention needs to be paid for each of the obstacles around the moving object, based on the acquired information regarding the obstacles and a moving state of the moving object; and present, to an occupant of the moving object, information for calling attention to an obstacle having a potential risk exceeding a predetermined value, based on a calculated potential risk of each of the obstacles.

19 Claims, 15 Drawing Sheets

(51) Int. Cl.
  *B60Q 1/08*   (2006.01)
  *B60W 30/095* (2012.01)
  *B60W 50/14*  (2020.01)
  *B60W 40/04*  (2006.01)
  *G06V 20/58*  (2022.01)

(52) U.S. Cl.
  CPC ............ *B60W 40/04* (2013.01); *B60W 50/14* (2013.01); *G06V 20/58* (2022.01); *B60Q 2300/45* (2013.01); *B60W 2050/143* (2013.01); *B60W 2050/146* (2013.01); *B60W 2554/4041* (2020.02); *B60W 2554/4042* (2020.02); *B60W 2554/4043* (2020.02); *B60W 2554/4044* (2020.02); *B60W 2554/4045* (2020.02)

(58) Field of Classification Search
  CPC ................ B60W 40/04; B60W 50/14; B60W 2050/143; B60W 2050/146; B60W 2554/4041; B60W 2554/4042; B60W 2554/4043; B60W 2554/4044; B60W 2554/4045; B60W 2554/4029; G06V 20/58; G06V 40/193; B60K 2370/149; B60K 2370/152; B60K 2370/178; B60K 2370/179; B60K 35/00; B60K 2370/1529
  See application file for complete search history.

(56) References Cited

U.S. PATENT DOCUMENTS

| | | | |
|---|---|---|---|
| 9,126,529 | B2 | 9/2015 | Nordbruch |
| 9,598,010 | B2 * | 3/2017 | Nespolo ................ B60Q 9/008 |
| 10,336,243 | B1 * | 7/2019 | Kuehnle ................ G06V 20/56 |
| 10,343,592 | B2 * | 7/2019 | Biswal ................ G06V 10/141 |
| 2006/0151223 | A1 * | 7/2006 | Knoll .................... H04N 7/183 |
| | | | 348/E7.087 |
| 2016/0318437 | A1 * | 11/2016 | Vilakathara .......... H05B 47/125 |

FOREIGN PATENT DOCUMENTS

| | | | |
|---|---|---|---|
| JP | 2001091618 | A * | 4/2001 |
| JP | 6091801 | | 3/2017 |

* cited by examiner

FIG.1
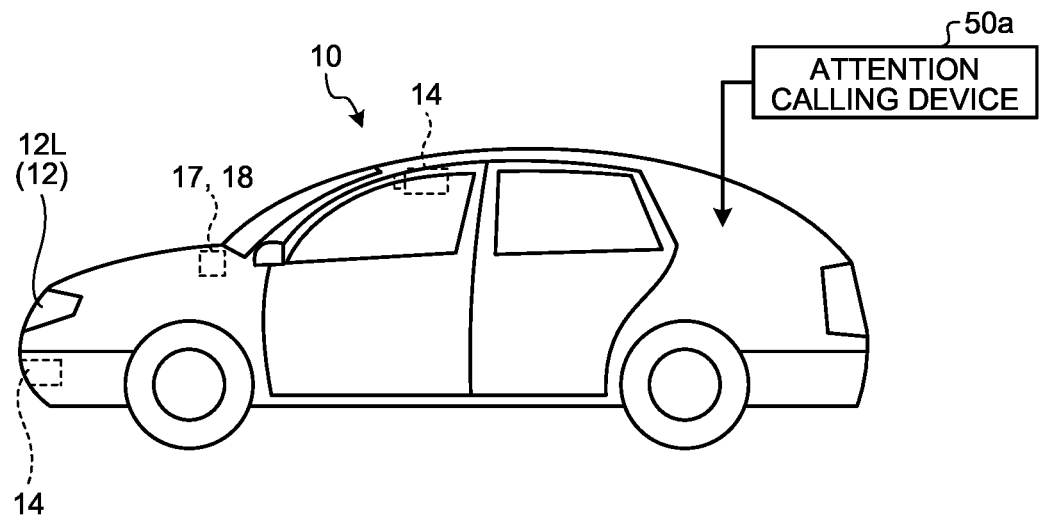
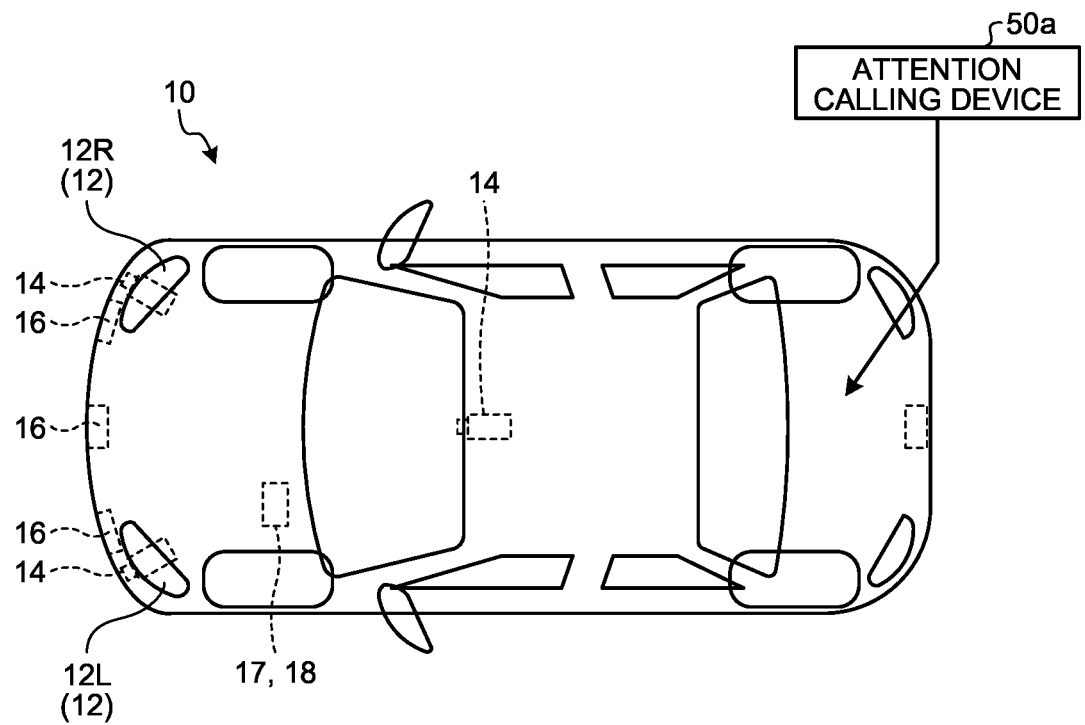

ATTENTION CALLING DEVICE, ATTENTION CALLING METHOD, AND COMPUTER-READABLE MEDIUM

CROSS-REFERENCE TO RELATED APPLICATIONS

This application is based upon and claims the benefit of priority from Japanese Patent Applications No. 2020-215085 and No. 2020-215745, both filed on Dec. 24, 2020, the entire contents of all of which are incorporated herein by reference.

FIELD

The present disclosure relates to an attention calling device, an attention calling method, and a computer-readable medium.

BACKGROUND

JP 6091801 B2 discloses a light transmission control device for a headlight of a vehicle that causes the headlight to emit light toward an obstacle when the obstacle is detected in a traveling direction of the vehicle.

The light transmission control device for the headlight according to JP 6091801 B2 performs transmission control of the headlight toward an obstacle close to the vehicle. Thus, in a case where there are a closer preceding vehicle and a farther rushing-out pedestrian at the same time, light transmission control toward the closer preceding vehicle is performed.

In general, in a case where there are a preceding vehicle that is within short distance and a rushing-out pedestrian who is within long distance at the same time, the preceding vehicle is easy to recognize, but the rushing-out pedestrian is hard to recognize. That is, in many cases, a degree to which attention needs to be paid, which is called a potential risk, is higher for a rushing-out pedestrian who is within long distance. For this reason, in the above-described situation, there has been concern that the rushing-out pedestrian may be recognized too late, if the headlight is directed toward the preceding vehicle.

In addition, the light transmission control device for the headlight according to JP 6091801 B2 calls attention of a driver of a vehicle by directing the headlight of the vehicle toward an obstacle present in a traveling direction of the vehicle. Thus, it is not considered to call attention of another vehicle following the vehicle. For this reason, there has been concern that, when the driver of the vehicle of which attention is called performs, for example, sudden braking in order to avoid the obstacle, a driver of the following vehicle may be surprised at the unexpected sudden braking.

As described above, there is a demand for further improving a device for calling attention of an occupant of a vehicle.

An object of the present disclosure is to provide an attention calling device capable of appropriately calling attention of an occupant of a moving object when there is an obstacle having a high potential risk in a moving direction of the moving object.

SUMMARY

An attention calling device according to the preset disclosure includes a memory and a hardware processor coupled to the memory. The hardware processor is configured to: acquire information regarding obstacles around a moving object detected by a sensor included in the moving object; calculate a potential risk that is a degree to which attention needs to be paid for each of the obstacles around the moving object, based on the acquired information regarding the obstacles and a moving state of the moving object; and present, to an occupant of the moving object, information for calling attention to an obstacle having a potential risk exceeding a predetermined value, based on a calculated potential risk of each of the obstacles.

BRIEF DESCRIPTION OF THE DRAWINGS

FIG. 1 is a diagram illustrating a schematic configuration of a vehicle equipped with an attention calling device according to a first embodiment;

DETAILED DESCRIPTION

First Embodiment

Figure 2:
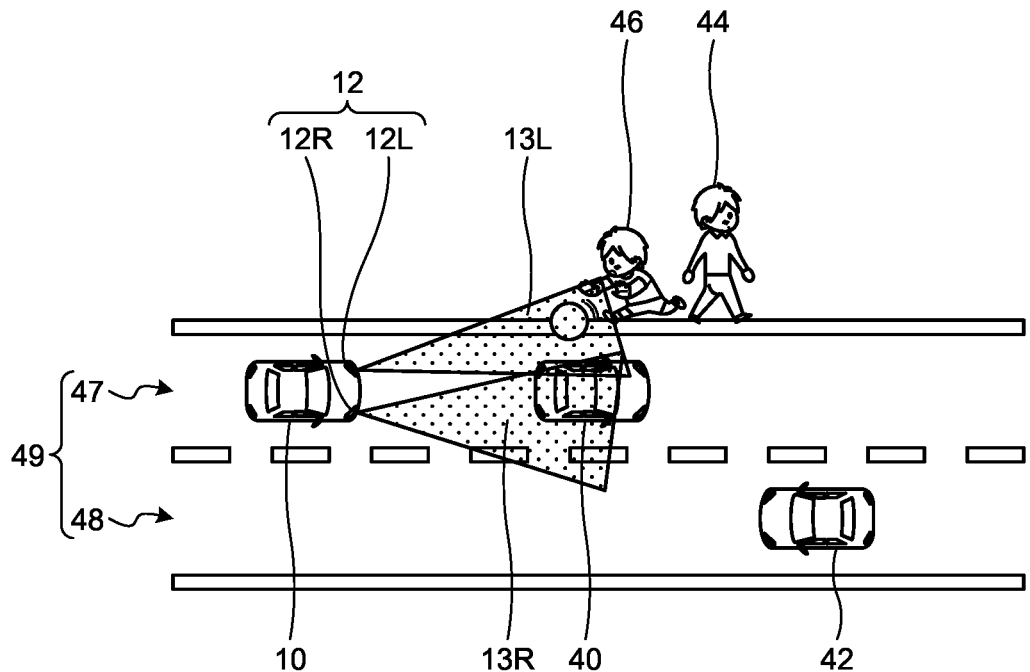
FIG. 2 is a diagram illustrating objects to which attention is called by the attention calling device according to the first embodiment.

Hereinafter, a first embodiment of an attention calling device according to the present disclosure will be described with reference to the drawings.

Overall Configuration of Attention Calling Device

First, an overall configuration of an attention calling device 50a will be described with reference to FIG. 1. FIG. 1 is a diagram illustrating a schematic configuration of a vehicle equipped with the attention calling device according to the first embodiment. Note that FIG. 1 illustrates respective states of the vehicle when viewed from side and when viewed from above.

The attention calling device 50a presents information for calling attention of an occupant of the vehicle 10, e.g., a driver, to an obstacle requiring attention in front of the vehicle 10. In particular, the attention calling device 50a of the present embodiment calls attention of the occupant of the vehicle 10 to an obstacle that needs to be noticed early, particularly at night, by controlling radiation characteristics of headlights 12 of the vehicle 10 so that the obstacle is illuminated.

As illustrated in FIG. 1, the vehicle 10 includes a pair of headlights 12 at front ends thereof. The headlights 12 include a left headlight 12L provided at a left-front end of the vehicle 10 and a right headlight 12R provided at a right-front end of the vehicle 10. Note that the vehicle 10 is an example of a moving object in the present disclosure.

Based on an instruction of the attention calling device 50a, the headlights 12 are each independently controlled as to the radiation characteristics of the left headlight 12L and the right headlight 12R, e.g., a light distribution direction, a light distribution angle, a light distribution pattern, an amount of light emission, and whether to turn on or off the headlight. This control causes the headlights 12 to more brightly illuminate as many obstacles as possible while securing a good field of view ahead on a travel lane. Further, this control makes it possible to illuminate each obstacle brightly even when the obstacle requiring attention is located at a distant position.

The vehicle 10 includes a plurality of cameras 14. In an example of FIG. 1, a camera 14 is installed near a roof in the interior of the vehicle to capture an image in front of vehicle 10 through a windshield. In addition, a plurality of cameras 14 are installed on a front bumper of the vehicle 10, and each of the cameras 14 captures an image in front of the vehicle 10 from the position of the front bumper. Based on the images captured by the plurality of cameras 14, a travel lane region, a shoulder region, and an opposite lane region are all monitored when the vehicle 10 is traveling. Note that although it is illustrated in the example of FIG. 1 that three cameras 14 are installed, the number of cameras 14 is not limited to three. That is, in a case where the camera 14 installed near the roof in the interior of the vehicle is capable of monitoring all the above-described regions, only one camera may be included. In addition, four or more cameras 14 may be provided. Further, the installation locations of the cameras 14 are also not limited to the example of FIG. 1. That is, the cameras 14 may be installed at any locations as long as all the above-described regions can be monitored.

Note that the camera 14 includes a solid-state imaging element such as a CCD sensor or a CMOS sensor. The solid-state imaging element has sensitivity to a visible light region to a near-infrared light region. Note that a camera 14 including an imaging element having sensitivity to a far-infrared light region, capable of monitoring a human or an animal and a target having a warm body with high sensitivity, may be used.

The attention calling device 50a acquires the image captured by the camera 14, and detects an obstacle in the image. This will be described in detail later (see FIG. 6).

In addition, the vehicle 10 includes a plurality of distance measuring sensors 16. The distance measuring sensor 16 is, for example, a millimeter wave radar, a LIDER, an ultrasonic sensor, or the like. In the example of FIG. 1, the plurality of distance measuring sensors 16 are installed on the front bumper of the vehicle 10 toward different directions, respectively. These distance measuring sensors 16 measure distances to targets present in the travel lane region, the shoulder region, and the opposite lane region when the vehicle 10 is traveling.

The attention calling device 50a detects an obstacle by acquiring the distance to the target measured by the distance measuring sensor 16. This will be described in detail later (see FIG. 6).

An antenna 17 and a GPS antenna 18 are installed in the vicinity of a dashboard of the vehicle 10. The antenna 17 receives a radio wave transmitted from a beacon post installed on the shoulder. Note that the radio wave transmitted from the beacon post includes information regarding a position of a pedestrian present near the vehicle 10 and a position of another vehicle present in the vicinity of the vehicle 10. For example, a radio wave tag carried by the pedestrian transmits information including a position of the radio wave tag to a roadside machine not illustrated in FIG. 1. The roadside machine transmits the received position of the radio wave tag from the beacon post to the vehicle 10. Similarly, information on positions of other vehicles transmitted from the other vehicles to the roadside machine is also transmitted from the beacon post to the vehicle 10. In addition to the antenna 17 and the GPS antenna 18, a mobile communication antenna for mobile communication system such as a fifth-generation (5G) may be provided. This makes it possible to, for example, receive information regarding a position of an obstacle or the like detected by another vehicle via a cloud or a server. In addition, a potential risk calculation model (see FIG. 6) to be described later can be updated via the cloud or the server.

The attention calling device 50a detects an obstacle by acquiring the position of the pedestrian or another vehicle received by an antenna 17. This will be described in detail later (see FIG. 6).

The GPS antenna 18 receives a GPS signal transmitted from a GPS satellite. The attention calling device 50a identifies a current position and traveling direction of the vehicle 10 by analyzing the GPS signal received by the GPS antenna 18. Note that a method of identifying the current position and traveling direction of the vehicle by analyzing the GPS signal has been widely in practical use in a car navigation system, and thus, the detailed description thereof will be omitted.

Operation Scene of Attention Calling Device

Next, objects to which the attention calling device 50a calls attention in the present embodiment will be described with reference to FIG. 2. FIG. 2 is a diagram illustrating objects to which attention is called by the attention calling device according to the first embodiment.

FIG. 2 schematically illustrates a typical nighttime traveling scene of the vehicle 10. That is, the vehicle 10 is traveling in a travel lane 47 of a road 49 having one lane each way. A preceding vehicle 40 is traveling in front of the vehicle 10. In an opposite lane 48, an opposite vehicle 42 is traveling in a direction to approach the vehicle 10. There are pedestrians 44 and 46 outside the travel lane 47 of the road 49. The pedestrian 44 is walking outside the road. The pedestrian 46 is a so-called a rushing-out pedestrian who is running from the outside of the road toward the travel lane 47.

The headlights 12 (12L and 12R) of the vehicle 10 are in a turn-on state. The left headlight 12L radiates light in a radiation range 13L. The right headlight 12R radiates light in a radiation range 13R.

Note that actual road circumstance is more complicated, and there is a stationary vehicle stopped on the shoulder, a bicycle traveling on the shoulder or on the travel lane, or the like. In order to simplify the description, the preceding vehicle 40, the opposite vehicle 42, and the pedestrians 44 and 46 illustrated in FIG. 2 are targets to which the attention calling device 50a of the present embodiment calls attention. Note that the number of targets to which attention is called may be increased by using a potential risk determination method (see FIG. 6) to be described later.

Operation Example (1) of Attention Calling Device

Figure 3:
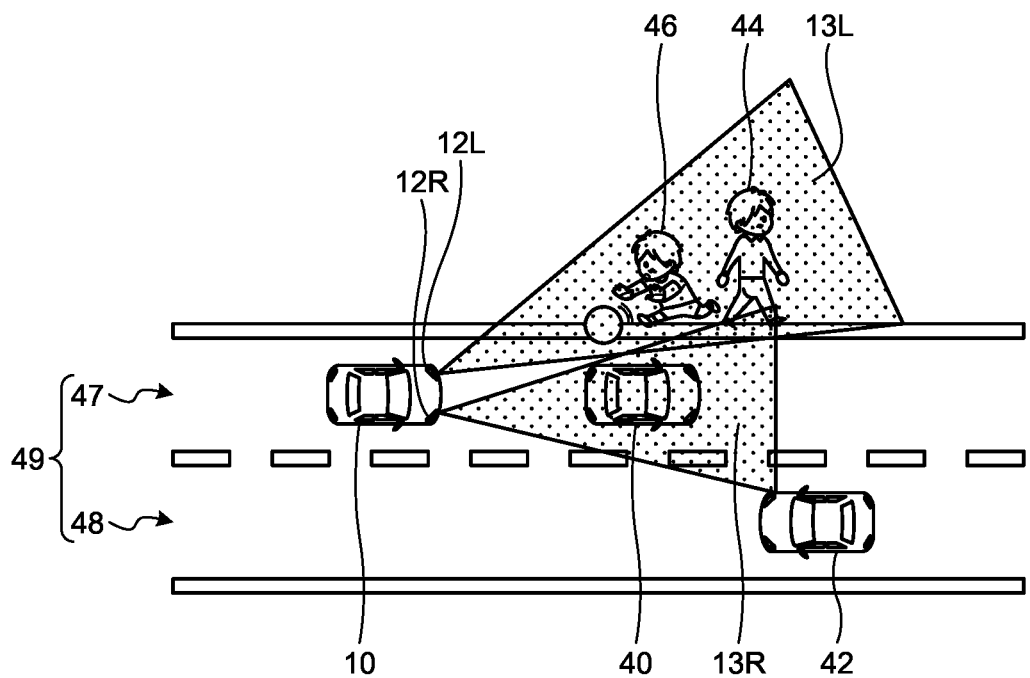
FIG. 3 is a first diagram illustrating a specific example in which attention is called by the attention calling device according to the first embodiment.

Next, an operation example of the attention calling device 50a in the scene of FIG. 2 will be described with reference to FIG. 3. FIG. 3 is a first diagram illustrating a specific example in which attention is called by the attention calling device according to the first embodiment.

The attention calling device 50a determines that there are potential risks in the scene of FIG. 2 in the following descending order of degree of potential risk: the pedestrian 46 (rushing-out pedestrian), the pedestrian 44, the preceding vehicle 40, and the opposite vehicle 42.

Then, the attention calling device 50a controls light distribution states of the headlights 12 of the vehicle 10 to brightly illuminate an obstacle whose potential risk exceeds a predetermined value. That is, the left headlight 12L is controlled to illuminate the pedestrian 46 and the pedestrian 44. Specifically, the attention calling device 50a controls a radiation direction and a radiation range of the left headlight 12L so that a region including the pedestrian 46 and the pedestrian 44 is illuminated. This control causes the left headlight 12L of the vehicle 10 to radiate light in a radiation range 13L illustrated in FIG. 3.

In addition, the attention calling device 50a controls the right headlight 12R to illuminate the preceding vehicle 40. This control causes the right headlight 12R of the vehicle 10 to radiate light in a radiation range 13R illustrated in FIG. 3.

Operation Example (2) of Attention Calling Device

Figure 4:
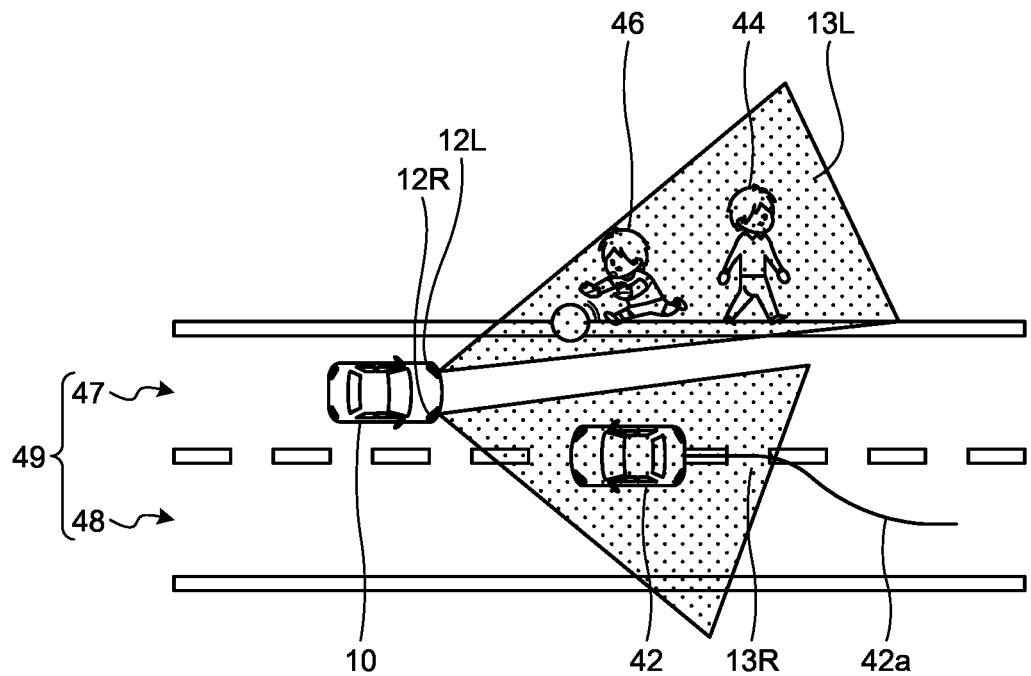
FIG. 4 is a second diagram illustrating a specific example in which attention is called by the attention calling device according to the first embodiment.

Next, a second operation example of the attention calling device 50a will be described with reference to FIG. 4. FIG. 4 is a second diagram illustrating a specific example in which attention is called by the attention calling device according to the first embodiment.

In the example of FIG. 4, the opposite vehicle 42 is traveling beyond the opposite lane 48. In addition, the pedestrians 44 and 46 are on the shoulder of the travel lane 47 as in the case of FIG. 3. The pedestrian 46 is a rushing-out pedestrian.

The attention calling device 50a determines that there are potential risks in the scene of FIG. 4 in the following descending order of degree of potential risk: the pedestrian 46 (rushing-out pedestrian), the opposite vehicle 42, and the pedestrian 44.

Then, the attention calling device 50a controls a radiation direction and an radiation range of the left headlight 12L so that a region including the pedestrian 46 and the pedestrian 44 is illuminated.

In addition, the attention calling device 50a controls a radiation direction and an radiation range of the right headlight 12R such that a region including the opposite vehicle 42 is illuminated.

Further, the attention calling device 50a performs control to cause both road surfaces in traveling directions of the opposite vehicle 42 and the vehicle 10 to be illuminated together by expanding the radiation range of the right headlight 12R to cause the headlights 12 to emit light in front of the vehicle 10 as well.

Operation Example (3) of Attention Calling Device

Figure 5:
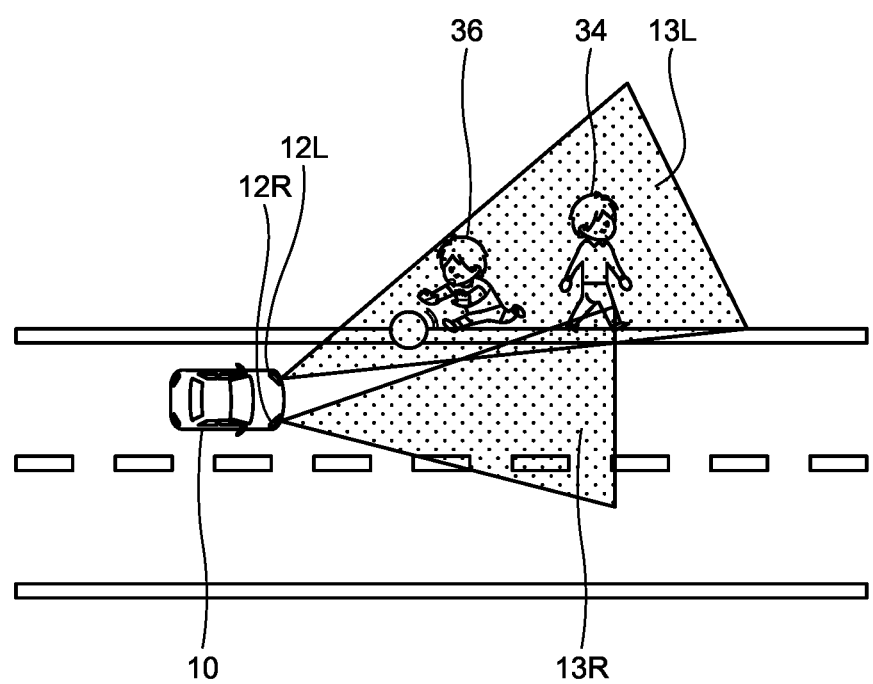
FIG. 5 is a third diagram illustrating a specific example in which attention is called by the attention calling device according to the first embodiment.

Next, a third operation example of the attention calling device 50a will be described with reference to FIG. 5. FIG. 5 is a third diagram illustrating a specific example in which attention is called by the attention calling device according to the first embodiment.

In the example of FIG. 5, the pedestrians 44 and 46 are on the shoulder of the travel lane 47 as in the cases of FIGS. 3 and 4. The pedestrian 46 is a rushing-out pedestrian. On the other hand, there are no obstacles in front of the vehicle 10 and on the opposite lane 48.

The attention calling device 50a determines that there are potential risks in the scene of FIG. 5 in the following descending order of degree of potential risk: the pedestrian 46 (rushing-out pedestrian) and the pedestrian 44.

Then, the attention calling device 50a controls a radiation direction and a radiation range of the left headlight 12L so that a region including the pedestrian 46 and the pedestrian 44 is illuminated.

Further, the attention calling device 50a controls a radiation range of the right headlight 12R to be directed forward of the vehicle 10, so that no attention in the forward direction of the vehicle 10 is prevented.

Note that the method of calling attention of the occupant of the vehicle 10 is not limited to the light distribution control of the headlights 12. For example, information for calling attention may be presented on a head-up display (HUD) of the vehicle 10. In addition, a warning sound may be output together with the light distribution control of the headlights 12 or the display of the information for calling attention on the HUD.

Potential Risk Calculation Method

Figure 6:
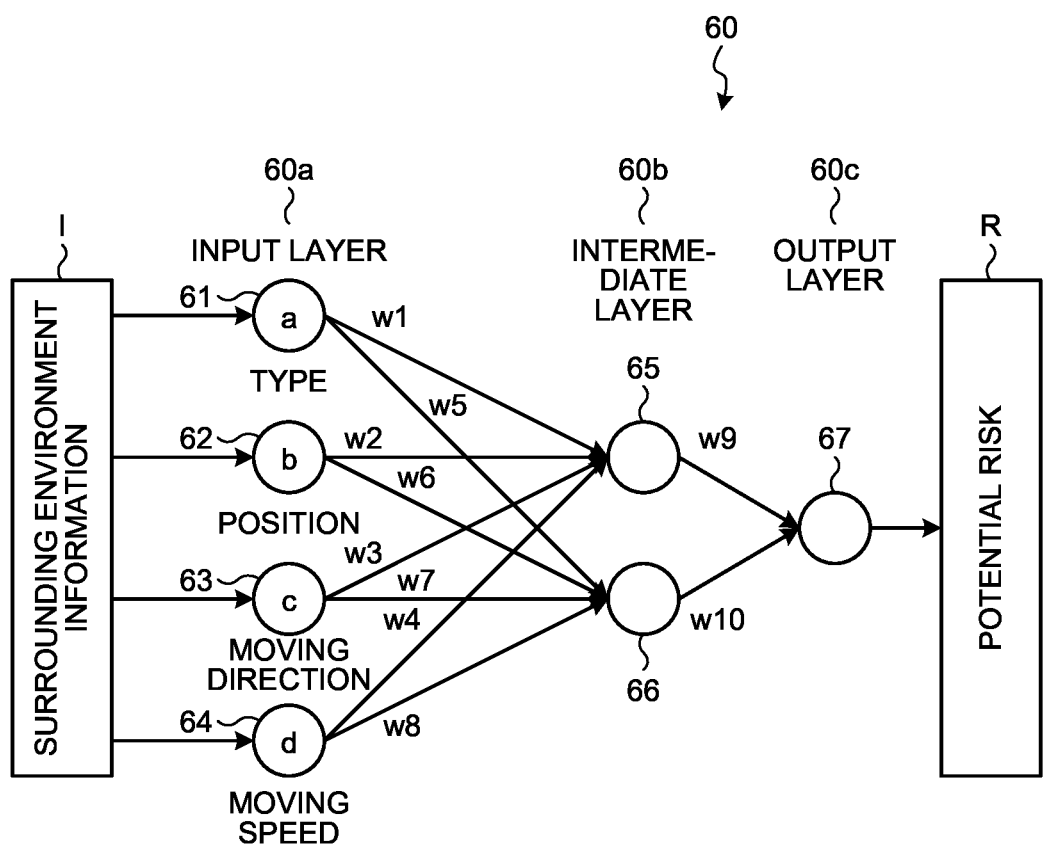
FIG. 6 is a diagram illustrating an example of a method of calculating a magnitude of a potential risk by the attention calling device according to the first embodiment.

Next, a method of calculating a potential risk R by the attention calling device 50a will be described with reference to FIG. 6. FIG. 6 is a diagram illustrating a method of calculating a magnitude of a potential risk by the attention calling device according to the first embodiment. Here, the method of calculating the potential risk using a neural network will be described. Examples of the method of calculating the potential risk may include a calculation method based on a mathematical rule base.

The attention calling device 50a stores a potential risk calculation model 60 generated in advance by learning such as deep learning. The potential risk calculation model 60 is, for example, a model receiving surrounding environment information I acquired from the cameras 14, the distance measuring sensors 16, and the antenna 17 as an input and outputting a potential risk R of each detected obstacle, that is, a degree to which attention needs to be paid.

In the example illustrated in FIG. 6, the potential risk calculation model 60 is configured by a neural network including an input layer 60a, an intermediate layer 60b, and an output layer 60c. The neural network is a mathematical model imitating a human neural network.

The surrounding environment information I acquired from the cameras 14, the distance measuring sensors 16, and the antenna 17 is input to the input layer 60a. More specifically, the input layer 60a includes four input units 61, 62, 63, and 64.

Information regarding types of obstacles, specifically numerical values respectively corresponding to the preceding vehicle 40, the opposite vehicle 42, and the pedestrians 44 and 46, are input to the input unit 61. Note that the attention calling device 50a identifies the types of obstacles by analyzing the surrounding environment information I acquired from the cameras 14, the distance measuring sensors 16, the antenna 17, and the like. Specifically, the types of obstacles are recognized by image template matching or pattern recognition using deep learning or the like. In this way, potential risks R can be calculated in a state where the types of obstacles as targets to which attention is called, such as a stopped vehicle and a bicycle, are further expanded as long as the types of obstacles can be recognized.

Information regarding positions of the obstacles is input to the input unit 62. The attention calling device 50a calculates the information regarding the positions of the obstacles based on the surrounding environment information I acquired from the cameras 14, the distance measuring sensors 16, the antenna 17, and the like. Note that, since the positions of the obstacles change according to a moving state of the vehicle 10, the attention calling device 50a corrects the positions of the obstacles included in the surrounding environment information I based on the surrounding environment information I and the moving state of the vehicle 10, for example, a moving speed and a moving direction of the vehicle 10. Then, the information regarding the positions of the obstacles is generated by identifying the positions at which the obstacles are present in a world coordinate system including the vehicle 10 and the road 49.

Information regarding moving directions of the obstacles is input to the input unit 63. The information regarding the moving directions of the obstacles is calculated by the attention calling device 50a detecting, for example, directions in which the above-described information regarding the positions of the obstacles shifts as time elapses.

Information regarding moving speeds of the obstacles is input to the input unit 64. The information regarding the moving speeds of the obstacles is calculated by the attention calling device 50a detecting, for example, speeds at which the above-described information regarding the positions of the obstacles shifts as time elapses.

Each of the numerical values input to the input layer 60a is output to the intermediate layer 60b. At this time, the numerical values output from the input layer 60a are integrated with weighting coefficients w1, w2, w3, w4, w5, w6, w7, and w8 given to branches connecting the input units 61, 62, 63, and 64 to intermediate units 65 and 66 of the intermediate layer 60b. The integrated numerical values are input to the intermediate layer 60b.

The intermediate layer 60b includes two intermediate units 65 and 66. The numerical values output from the input units 61, 62, 63, and 64 are input to the intermediate unit 65 after being integrated with the weighting coefficients w1, w2, w3, and w4, respectively. The numerical values output from the input units 61, 62, 63, and 64 are input to the intermediate unit 66 after being integrated with the weighting coefficients w5, w6, w7, and w8, respectively.

The intermediate units 65 and 66 add up the numerical values input from the input units 61, 62, 63, and 64 to the intermediate units 65 and 66. A numerical value obtained through the adding-up is output to the output layer 60c.

The numerical values output from the intermediate layer 60b are integrated with weighting coefficients w9 and w10 given to branches connecting the intermediate units 65 and 66 to an output unit 67 of the output layer 60c, respectively. The integrated numerical values are input to the output layer 60c.

The output unit 67 includes one output unit 67. The numerical values output from the intermediate units 65 and 66 are input to the output unit 67 after being integrated with the weighting coefficients w9 and w10, respectively.

The output unit 67 adds up the numerical values input from the intermediate units 65 and 66 to the output unit 67. Then, the output unit 67 outputs a numerical value obtained through the adding-up. The numerical value output by the output unit 67 is a potential risk R. The potential risk R is normalized to, for example, a numerical value between 0 and 100. The larger the numerical value, the higher the potential risk.

Next, an example in which the potential risk R is calculated will be described. For example, it is assumed that, by analyzing the surrounding environment information I acquired from the cameras 14, the distance measuring sensors 16, and the antenna 17, the following information is obtained for a certain obstacle: type a of obstacle=20, position b of obstacle=12, moving direction c of obstacle=50, and moving speed d of obstacle=40. In addition, it is assumed that the weighting coefficients of the network are w1=0.7, w2=0.5, w3=0, w4=0, w5=0, w6=0.8, w7=0.9, w8=0.5, w9=1, and w10=1.

In this case, the potential risk calculation model 60 calculates the potential risk R of the obstacle according to (Equation 1).

$$R=(a*w1+b*w2)+(b*w6+c*w7+d*w8)=95 \qquad \text{(Equation 1)}$$

The potential risk R calculated according to (Equation 1) is nearly a maximum value, and the corresponding obstacle is determined as an obstacle to which a very high degree of attention needs to be paid.

In the potential risk calculation model 60, the weighting coefficients w1 to w10 of the network are optimized by learning states of many obstacles and potential risks R of the obstacles in advance.

Note that the potential risk R can also be calculated using only the information regarding, for example, the position of the obstacle instead of the potential risk calculation model 60 illustrated in FIG. 6. In this case, a simplified potential risk calculation model 60 is used. That is, the input unit 61 for inputting the information regarding type is unnecessary. Then, the information regarding the positions of the obstacles is input to the input unit 62. Then, directions in which the positions of the obstacles shift as time elapses are input to the input unit 63. Directions in which the positions of the obstacles shift as time elapses are input to the input unit 64.

Next, an example of how to call attention to a corresponding obstacle according to a value of a potential risk R will be described.

When the potential risk R is 90 or more, the attention calling device 50a determines that it is necessary to immediately pay attention to the corresponding obstacle. At this time, the attention calling device 50a most preferentially controls the radiation characteristics of the headlights 12 to project light to an obstacle to which attention needs to be paid. Note that when the vehicle 10 has an automatic braking function, the vehicle 10 may be automatically decelerated by operating the automatic brake. In addition, when the vehicle 10 has an automatic steering function, a traveling direction may be controlled to avoid an obstacle by controlling a steering angle of the vehicle 10.

When the potential risk R is 70 or more and less than 90, the attention calling device 50a determines that it is necessary to pay attention to the corresponding obstacle. At this time, the attention calling device 50a controls the radiation characteristics of the headlights 12 to project light to an obstacle to which attention needs to be paid. Note that, at this time, a warning sound may be output by a buzzer or a chime mounted on the vehicle 10. In addition, information (e.g., a caution symbol) for calling attention may be displayed on the head-up display (HUD) mounted on the vehicle 10.

When the potential risk R is greater than 30 and less than 70, the attention calling device 50a determines that the corresponding obstacle requires attention. At this time, the attention calling device 50a controls the radiation characteristics of the headlights 12 to project an obstacle requiring attention.

When the potential risk R is 30 or less, the attention calling device 50a determines that there is no obstacle or no attention needs to be paid even though there is an obstacle. At this time, the attention calling device 50a normally projects light from the headlights 12 of the vehicle 10.

The attention calling device 50a calls attention based on the value of the potential risk R of each of the obstacles detected as described above.

Hardware Configuration of Attention Calling Device

Figure 7:
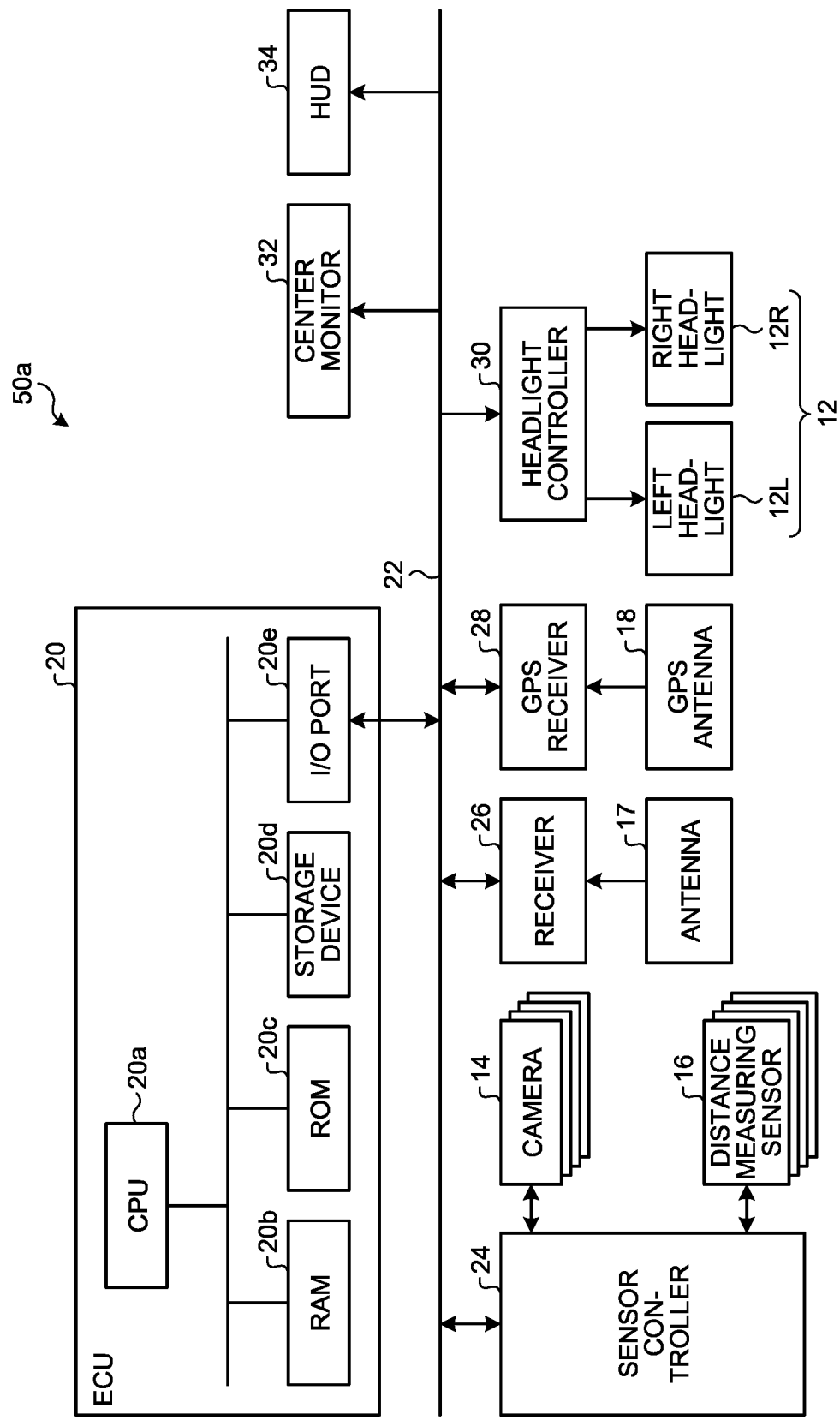
FIG. 7 is a hardware block diagram illustrating an example of a hardware configuration of the attention calling device according to the first embodiment.

Next, a hardware configuration of the attention calling device 50a will be described with reference to FIG. 7. FIG. 7 is a hardware block diagram illustrating an example of the hardware configuration of the attention calling device according to the first embodiment.

The attention calling device 50a includes an electronic control unit (ECU) 20, a sensor controller 24, a receiver 26, a GPS receiver 28, a headlight controller 30, a center monitor 32, and a head-up display (HUD) 34. These units are connected to each other by a bus 22.

The ECU 20 is configured as a computer including, for example, a central processing unit (CPU) 20a, which is an example of a hardware processor, a random access memory (RAM) 20b, and a read only memory (ROM) 20c. Note that the ECU 20 may include a storage device 20d configured as a hard disk drive (HDD) or the like. In addition, the ECU 20 includes an input/output (I/O) port 20e capable of transmitting and receiving detection signals and various types of information to and from various sensors and the like.

Each of the RAM 20b, the ROM 20c, the storage device 20d, and the I/O port 20e of the ECU 20 is configured to transmit and receive various types of information to and from the CPU 20a via, for example, an internal bus.

The ECU 20 controls various processes performed by the attention calling device 50a by causing the CPU 20a to execute programs installed in the ROM 20c.

Note that the programs to be executed by the attention calling device 50a of the present embodiment may be provided in a state where the programs are built in the ROM 20c in advance, or may be provided in a state where the programs are recorded in a computer-readable recording medium such as a CD-ROM, a flexible disk (FD), a CD-R, or a digital versatile disk (DVD) as a file in an installable format or in an executable format.

Further, the programs to be executed by the attention calling device 50a of the present embodiment may be configured to be provided by being downloaded via a network such as the Internet in a state where the programs are stored on a computer connected to the network. In addition, the programs to be executed by the attention calling device 50a of the present embodiment may be provided or distributed via a network such as the Internet.

The storage device 20d stores map data used to identify a current position of the vehicle 10, weighting coefficients w1 to w10 of the potential risk calculation model 60 that has finished learning, and the like.

The sensor controller 24 controls operations of the cameras 14 and the distance measuring sensors 16. In addition, the sensor controller 24 acquires images captured by the cameras 14 and distance data measured by the distance measuring sensors 16, and transmits the acquired images and data to the ECU 20.

The receiver 26 acquires positions of pedestrians and other vehicles received by the antenna 17 and transmits the acquired positions to the ECU 20.

The GPS receiver 28 acquires a GPS signal transmitted from the GPS satellite and transmits the received GPS signal to the ECU 20. The GPS signal is used to identify a current position and a traveling direction of the vehicle 10.

The headlight controller 30 forms predetermined radiation characteristics by independently controlling the left headlight 12L and the right headlight 12R based on an instruction from the ECU 20.

The center monitor 32 is installed in a center console of the vehicle 10, and displays a map around the vehicle 10, an operation state, an operation screen or the like of an air conditioner, an audio, and the like. In addition, as will be described later in a modification of the first embodiment, the center monitor 32 displays an obstacle particularly requiring attention to be emphasized in an image captured by the camera 14 in the forward direction of the vehicle.

The head-up display 34 (hereinafter referred to as HUD 34) displays vehicle information such as a vehicle speed, route guidance information, and the like to be projected on the windshield of vehicle 10. In addition, as will be described later in a modification of the first embodiment, the HUD 34 displays an obstacle particularly requiring attention in an emphasized manner.

Functional Configuration of Attention Calling Device

Figure 8:
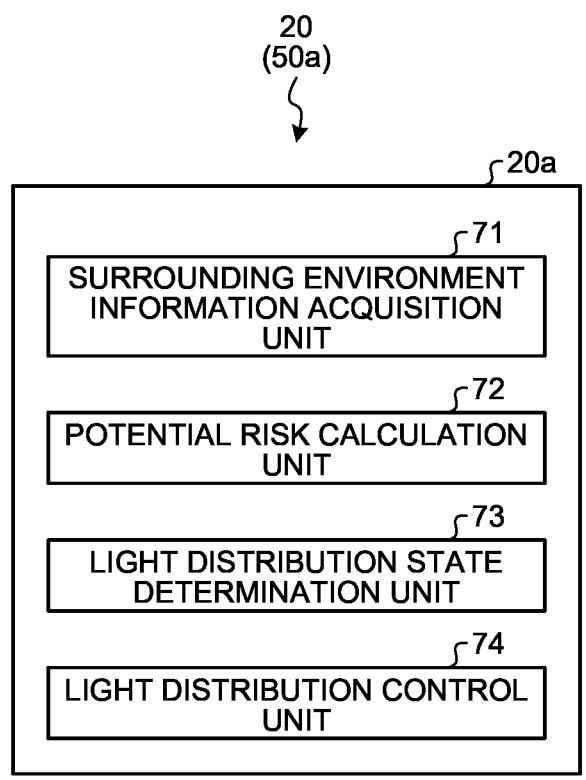
FIG. 8 is a functional block diagram illustrating an example of a functional configuration of the attention calling device according to the first embodiment.

Next, a functional configuration of the attention calling device 50a will be described with reference to FIG. 8. FIG. 8 is a functional block diagram illustrating an example of the functional configuration of the attention calling device according to the first embodiment.

The ECU 20 of the attention calling device 50a causes the RAM 20b to develop a control program, which is stored in the ECU 20, and causes the CPU 20a to operate the control program, thereby implementing a surrounding environment information acquisition unit 71, a potential risk calculation unit 72, a light distribution state determination unit 73, and a light distribution control unit 74 illustrated in FIG. 8 as functional units.

The surrounding environment information acquisition unit 71 acquires information regarding obstacles around the vehicle 10 (moving object). Note that the surrounding environment information acquisition unit 71 is an example of an acquisition unit in the present disclosure.

More specifically, the surrounding environment information acquisition unit 71 acquires types, positions, moving directions, and moving speeds of obstacles present around the vehicle 10, based on images captured by the cameras 14, distance data measured by the distance measuring sensors 16, and positions of pedestrians and other vehicles acquired by the antenna 17, all of which are included in the vehicle 10. The technology for combining the information acquired by the plurality of sensors as described above is called sensor fusion, and is capable of improving accuracy in detecting a target, which is an obstacle in the present embodiment. Note that, since many methods for acquiring the information regarding the obstacles based on the information acquired from the cameras 14, the distance measuring sensors 16, and the antenna 17 have been proposed recently, any of these methods may be used.

The potential risk calculation unit 72 calculates respective potential risks R of the obstacles around the vehicle 10 based on the information regarding the obstacles acquired by the surrounding environment information acquisition unit 71 and the moving state, for example, a moving speed and a moving direction, of the vehicle 10. Note that the potential risk calculation unit 72 is an example of a calculation unit in the present disclosure.

The light distribution state determination unit 73 determines radiation characteristics of the headlights 12 based on the potential risks R calculated by the potential risk calculation unit 72. For example, the light distribution state determination unit 73 determines the radiation characteristics to cover obstacles having potential risks R exceeding a predetermined value. Note that the radiation characteristics determined by the light distribution state determination unit 73 also includes illuminating an area of the travel lane 47 on which the vehicle 10 is traveling.

The light distribution control unit 74 controls the radiation characteristics of the headlights 12 based on a light distribution pattern determined by the light distribution state determination unit 73. An obstacle having a potential risk R exceeding a predetermined value depending on the radiation characteristics controlled by the light distribution control unit 74, that is, an obstacle particularly requiring attention, is emphasized when presented to the occupant of the vehicle 10. Note that the light distribution control unit 74 is an example of an information presentation unit in the present disclosure.

Flow of Process Performed by Attention Calling Device

Figure 9:
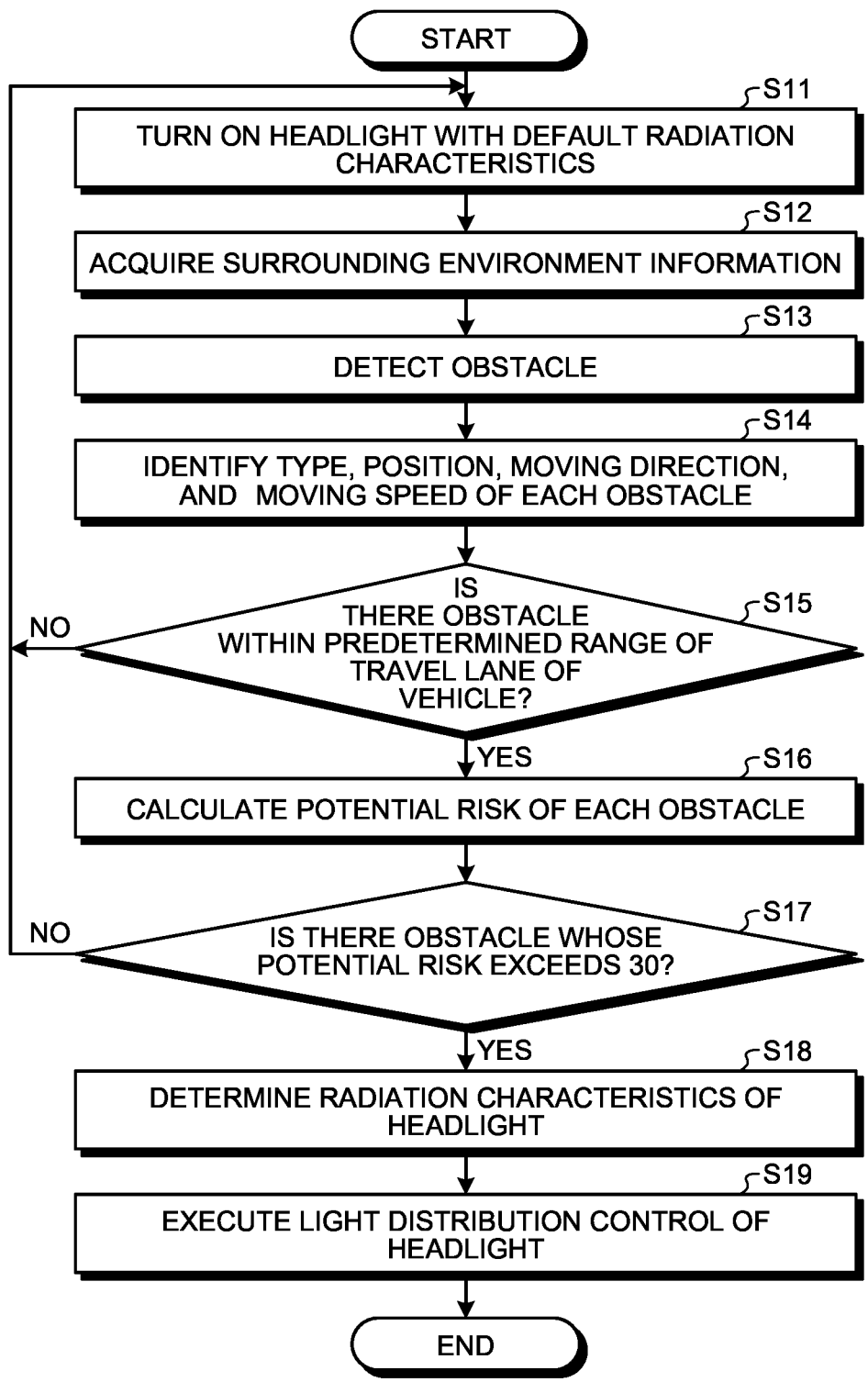
FIG. 9 is a flowchart illustrating an example of a flow of a process performed by the attention calling device according to the first embodiment.

Next, a flow of a process performed by the attention calling device 50a will be described with reference to FIG. 9. FIG. 9 is a flowchart illustrating an example of the flow of the process performed by the attention calling device according to the first embodiment.

The light distribution control unit 74 causes the headlights 12 to emit light with default radiation characteristics (Step S11).

The surrounding environment information acquisition unit 71 acquires surrounding environment information I (see FIG. 6) of the vehicle 10 (Step S12).

Then, the surrounding environment information acquisition unit 71 detects an obstacle present around the vehicle 10 from the acquired surrounding environment information I (Step S13).

Further, the surrounding environment information acquisition unit 71 identifies a type, a position, a moving direction, and a moving speed of each obstacle detected in Step S13 (Step S14).

Then, the surrounding environment information acquisition unit 71 determines whether there is an obstacle within a predetermined range of the travel lane 47 of the vehicle 10 (Step S15). Here, the predetermined range of the travel lane 47 of the vehicle 10 includes a region of the travel lane 47, a region of the shoulder, and a region of the opposite lane 48. When it is determined that there is an obstacle within the predetermined range of the travel lane 47 of the vehicle 10 (Step S15: Yes), the process proceeds to Step S16. On the other hand, when it is not determined that there is an obstacle within the predetermined range of the travel lane 47 of the vehicle 10 (Step S15: No), the process returns to Step S11.

When it is determined in Step S15 that there is an obstacle within the predetermined range of the travel lane 47 of the vehicle 10, the potential risk calculation unit 72 calculates a potential risk R of each obstacle within the predetermined range of the travel lane 47 of the vehicle 10 (Step S16). The method of calculating the potential risk R is as described above (see FIG. 6).

Subsequently, the potential risk calculation unit 72 determines whether there is an obstacle whose potential risk R exceeds a predetermined value (e.g., 30) (Step S17). When it is determined that there is an obstacle whose potential risk R exceeds the predetermined value (Step S17: Yes), the process proceeds to Step S18. On the other hand, when it is not determined that there is an obstacle whose potential risk R exceeds the predetermined value (Step S17: No), the process returns to Step S11.

When it is determined in Step S17 that there is an obstacle whose potential risk R exceeds the predetermined value, the light distribution state determination unit 73 determines radiation characteristics of the headlights 12 (Step S18).

The light distribution control unit 74 independently controls radiation characteristics of the left headlight 12L and the right headlight 12R by controlling the headlight controller 30, such that the radiation characteristics determined by the light distribution state determination unit 73 in Step S18 are realized. Thereafter, the attention calling device 50a ends the process of FIG. 9.

Effect of First Embodiment

As described above, in the attention calling device 50a according to the first embodiment, the surrounding environment information acquisition unit 71 (acquisition unit) acquires information regarding obstacles around the vehicle 10 (moving object) detected by the sensors included in the vehicle 10. The potential risk calculation unit 72 (calculation unit) calculates a potential risk R, which is a degree to which attention needs to be paid, for each of the obstacles around the vehicle 10, based on the information regarding the obstacles acquired by the surrounding environment information acquisition unit 71 and the moving state of the vehicle 10. Then, the light distribution control unit 74 (information presentation unit) presents to the occupant of the vehicle 10 information for calling attention to an obstacle whose potential risk R exceeds a predetermined value, based on the respective potential risks R of the obstacles calculated by the potential risk calculation unit 72. Therefore, when there is an obstacle having a high potential risk R in the moving direction of the vehicle 10, it is possible to appropriately call attention of the occupant of the vehicle 10.

In addition, in the attention calling device 50a according to the first embodiment, the light distribution control unit 74 (information presentation unit) controls the radiation characteristics of the headlights 12 of the vehicle 10 according to the position of the obstacle whose potential risk R exceeds the predetermined value. Therefore, it is possible to call attention of the occupant of the vehicle 10 to an obstacle having a high potential risk R, which particularly requires attention. Accordingly, the occupant of the vehicle 10 can be prevented from overlooking the corresponding obstacle.

In addition, in the attention calling device 50a according to the first embodiment, the light distribution control unit 74 (information presentation unit) directs radiation directions of the headlights 12 (12L and 12R) toward an obstacle whose potential risk R exceeds the predetermined value. Therefore, it is possible to call attention of the occupant of the vehicle 10 to an obstacle having a high potential risk R, which particularly requires attention.

In addition, in the attention calling device 50a according to the first embodiment, the light distribution control unit 74 (information presentation unit) changes the light distribution of the headlights 12 (12L and 12R) such that their illuminance is higher toward an obstacle whose potential risk R exceeds the predetermined value. Therefore, it is possible to call attention of the occupant of the vehicle 10 to an obstacle having a high potential risk R, which particularly requires attention.

In addition, in the attention calling device 50a according to the first embodiment, the information regarding obstacles includes at least positions of the obstacles. Therefore, since moving directions and moving speeds of obstacles can be estimated by obtaining temporal changes in position of the obstacles, an obstacle having a high potential risk R can be detected with a small amount of data.

In addition, in the attention calling device 50a according to the first embodiment, the information regarding obstacles includes types, positions, moving directions, and moving speeds of the obstacles. Therefore, an obstacle having a high potential risk R, like the rushing-out pedestrian 46, can also be reliably detected.

In addition, in the attention calling device 50a according to the first embodiment, the moving state of the vehicle 10 (moving object) includes at least a moving speed and a moving direction of the vehicle 10. Therefore, an obstacle around the vehicle 10 can be detected without resort to the moving state of the vehicle 10.

Modification of First Embodiment

Next, a modification of the attention calling device 50a described above will be described. The attention calling device 50a described here has not only a function of causing the headlights 12 to emit light toward an obstacle particularly requiring attention but also a function of informing the occupant of the vehicle 10 of the position of the obstacle particularly requiring attention.

Figure 10:
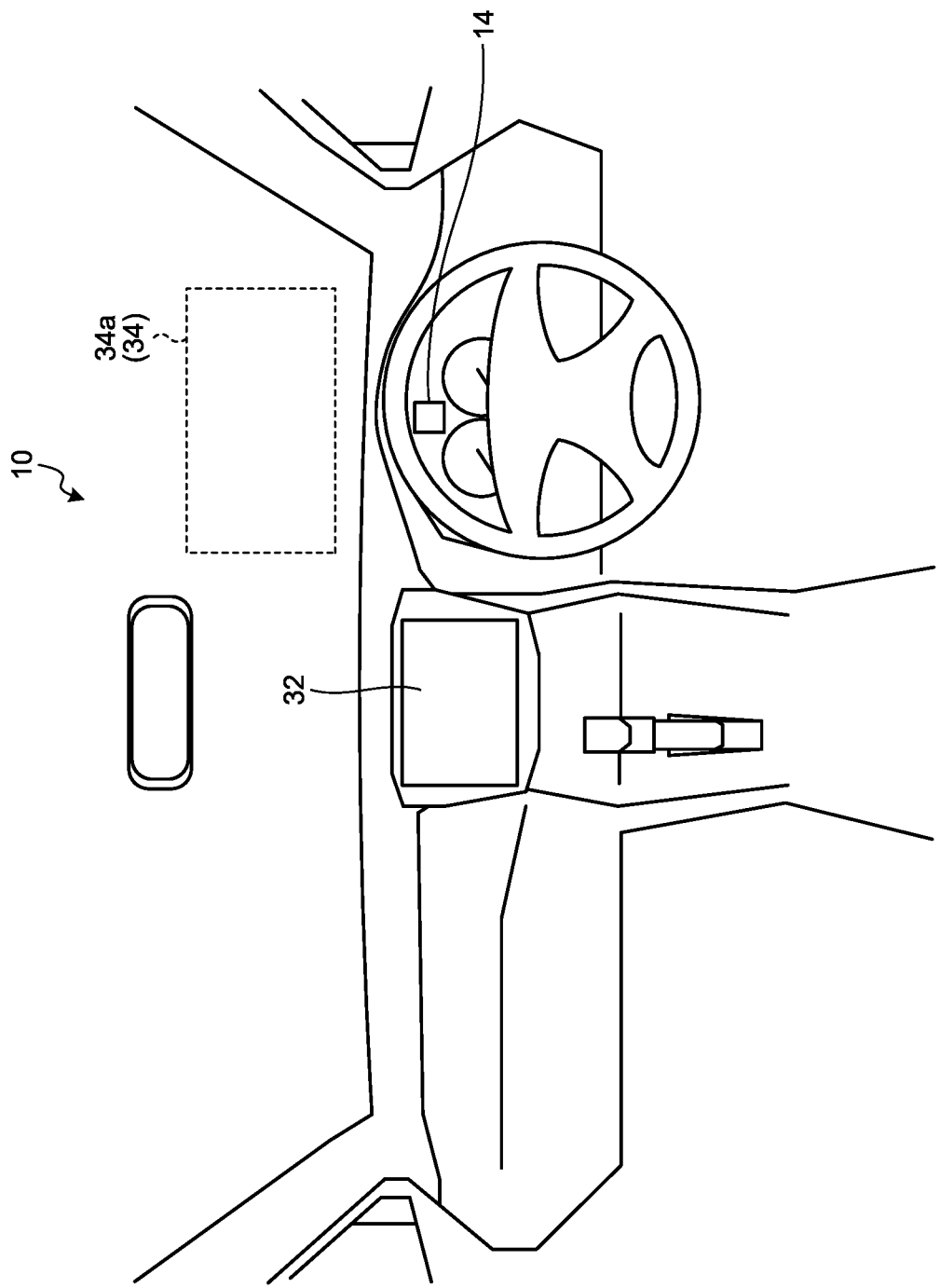
FIG. 10 is a schematic diagram illustrating a state in which an attention calling device according to a modification of the first embodiment is mounted on the vehicle.

First, a state in which the attention calling device 50a according to the modification of the first embodiment is mounted on the vehicle 10 will be described with reference to FIG. 10. FIG. 10 is a schematic diagram illustrating a state in which the attention calling device according to the modification of the first embodiment is mounted on the vehicle.

Figure 11:
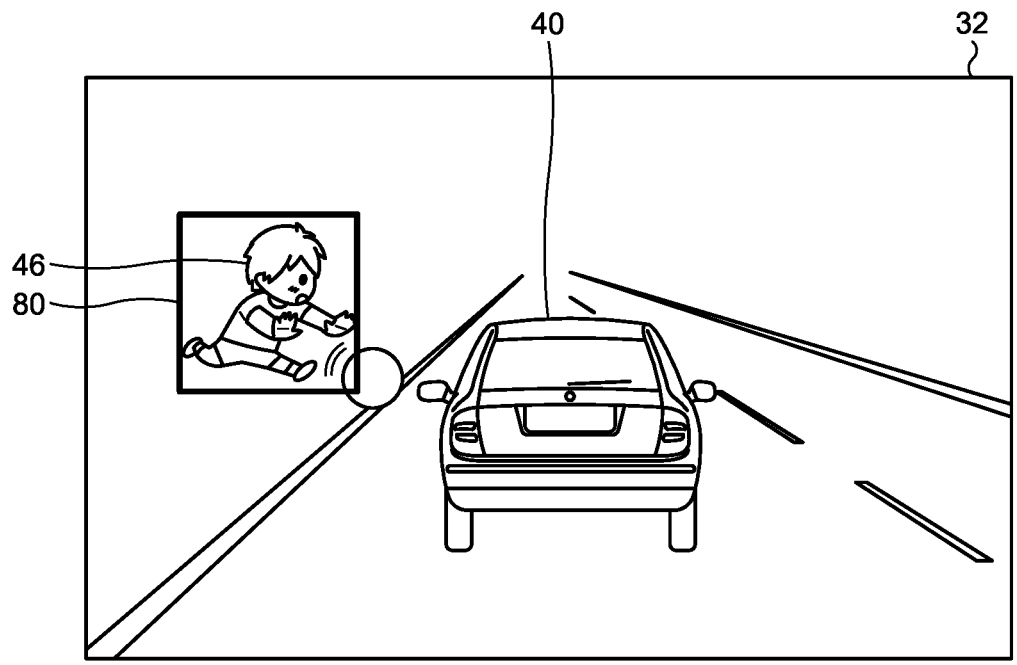
FIG. 11 is a first diagram illustrating an example in which attention is called according to the modification of the first embodiment.
Figure 12:
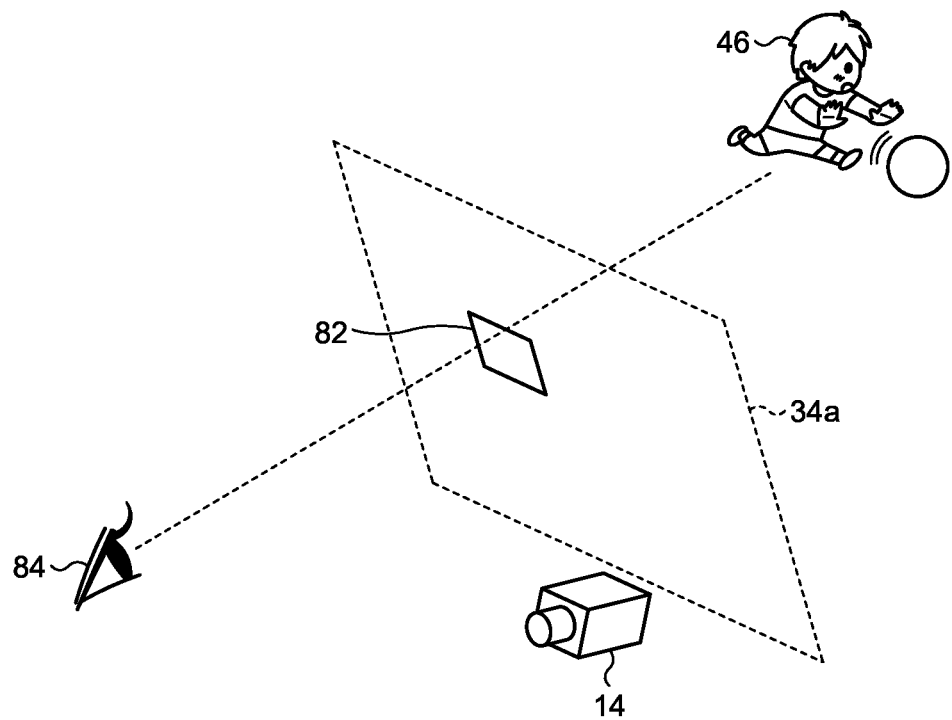
FIG. 12 is a second diagram illustrating an example in which attention is called according to the modification of the first embodiment.

The attention calling device 50a according to the modification of the first embodiment displays a position of an obstacle particularly requiring attention on the center monitor 32 or on a display area 34a of the HUD 34 (see FIGS. 11 and 12). Note that the attention calling device 50a further includes a camera 14 illustrated in FIG. 10 in addition to the above-described hardware configuration of the attention calling device 50a. The camera 14 is installed on a meter cluster of the vehicle 10 to face a driver's face to capture an image including driver's eyes.

The attention calling device 50a detects a position of the driver's eyes from the image captured by the camera 14. Then, based on the position of the driver's eyes, information for emphasizing the position of the obstacle particularly requiring attention, which has been detected by the attention calling device 50a, is displayed on the display area 84a. This will be described in detail later (see FIG. 12).

Operation Example (1) of Modification of First Embodiment

Next, a first operation example of the attention calling device 50a according to the modification of the first embodiment will be described with reference to FIG. 11. FIG. 11 is a first diagram illustrating an example in which attention is called according to the modification of the first embodiment.

The attention calling device 50a displays images captured by the cameras 14 on the center monitor 32 in real time. Note that since the plurality of cameras 14 are installed on the vehicle 10, the attention calling device 50a panoramically combines the images captured by the plurality of cameras 14 into one image and displays the combined image on the center monitor 32.

Further, the attention calling device 50a displays a position of an obstacle whose potential risk R exceeds a predetermined value, that is, an obstacle particularly requiring attention, in a superimposed manner on the image captured in the forward direction of the vehicle, which is displayed on the center monitor 32. Note that the position of the obstacle is detected by the action of the surrounding environment information acquisition unit 71 described above.

The position of the obstacle particularly requiring attention may be superimposed on the image in any method, and in the example of FIG. 11, the position of the obstacle particularly requiring attention is emphasized by drawing a marker 80 circumscribing the corresponding obstacle (rushing-out pedestrian 46).

Operation Example (2) of Modification of First Embodiment

Next, a second operation example of the attention calling device 50a according to the modification of the first embodiment will be described with reference to FIG. 12. FIG. 12 is a second diagram illustrating an example in which attention is called according to the modification of the first embodiment.

The attention calling device 50a emphasizes a position of an obstacle whose potential risk R exceeds a predetermined value, that is, an obstacle particularly requiring attention, by drawing a marker 82 emphasizing a region of the obstacle particularly requiring attention on the display area 34a of the HUD 34.

In this case, the attention calling device 50a detects a position of driver's eyes 84 of the vehicle 10. Then, the marker 82 is displayed at a position where a straight line connecting the position of the driver's eyes 84 and the position of the obstacle particularly requiring attention intersects the display area 34a. Accordingly, when the driver gazes at the marker 82, the driver can visually recognize the obstacle particularly requiring attention at the end of the line of sight.

Note that the attention calling device 50a detects the position of the driver's eyes 84, using a known face recognition algorithm or the like, from an image including a driver's face, which is captured by the camera 14 installed on the meter cluster of the vehicle 10.

Functional Configuration of Modification of First Embodiment

Figure 13:
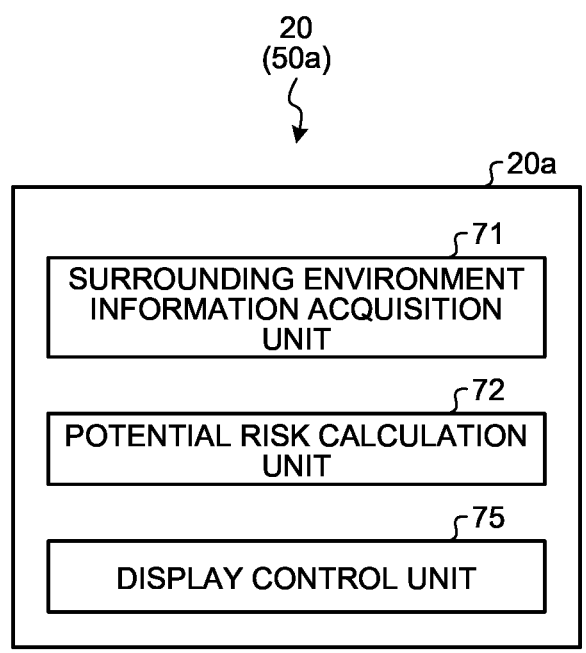
FIG. 13 is a functional block diagram illustrating an example of a functional configuration of the attention calling device according to the modification of the first embodiment.

Next, a functional configuration of the attention calling device 50a according to the modification of the first embodiment will be described with reference to FIG. 13. FIG. 13 is a functional block diagram illustrating an example of the functional configuration of the attention calling device according to the modification of the first embodiment.

The ECU 20 of the attention calling device 50a causes the RAM 20b to develop a control program, which is stored in the ECU 20, and causes the CPU 20a to operate the control program, thereby implementing a surrounding environment information acquisition unit 71, a potential risk calculation unit 72, and a display control unit 75 illustrated in FIG. 13 as functional units.

Since the functions of the surrounding environment information acquisition unit 71 and the potential risk calculation unit 72 are as described above (see FIG. 8), the description thereof will be omitted.

The display control unit 75 displays a position of an obstacle whose potential risk R exceeds a predetermined value on a display device included in the vehicle 10. Note that the display control unit 75 is an example of an information presentation unit in the present disclosure. Here, the display device included in the vehicle 10 is the center monitor 32 or the HUD 34 described above. In addition, the display control unit 75 detects a position of driver's eyes, for example, on the HUD 34, when the position of the obstacle particularly requiring attention is displayed. Then, a marker 82 (see FIG. 12) emphasizing the obstacle is displayed at a position corresponding to the position of the driver's eyes and the position of the obstacle particularly requiring attention.

Note that, although a function of controlling light distribution of the headlights 12 of the vehicle 10 is not described in the functional block diagram of FIG. 13, the light distribution state determination unit 73 and the light distribution control unit 74 illustrated in FIG. 8 may be further included in the functional block diagram of FIG. 13.

Effect of Modification of First Embodiment

As described above, in the attention calling device 50a according to the modification of the first embodiment, the display control unit 75 (information presentation unit) displays the position of the obstacle whose potential risk R exceeds the predetermined value on the display device included in the vehicle 10 (moving object). Therefore, it is possible to call attention to an obstacle regardless of day or night.

In addition, in the attention calling device 50a according to the modification of the first embodiment, the display device is the center monitor 32 (in-vehicle monitor). Therefore, it is possible to call attention using the center monitor 32 that is already provided in the vehicle for the purpose of displaying a car navigation screen or the like.

In addition, in the attention calling device 50a according to the modification of the first embodiment, the display device is the HUD 34. Therefore, it is possible to display a position of an obstacle requiring attention in an emphasized manner without hindering the driver's visual recognition action for confirming safety ahead during driving. In particular, since the information for emphasizing the obstacle is displayed at a position corresponding to the position of the driver's eyes, it is possible to shorten a time until the obstacle is found.

Second Embodiment

Hereinafter, a second embodiment of an attention calling device according to the present disclosure will be described with reference to the drawings.

Operation Example of Attention Calling Device

Figure 14:
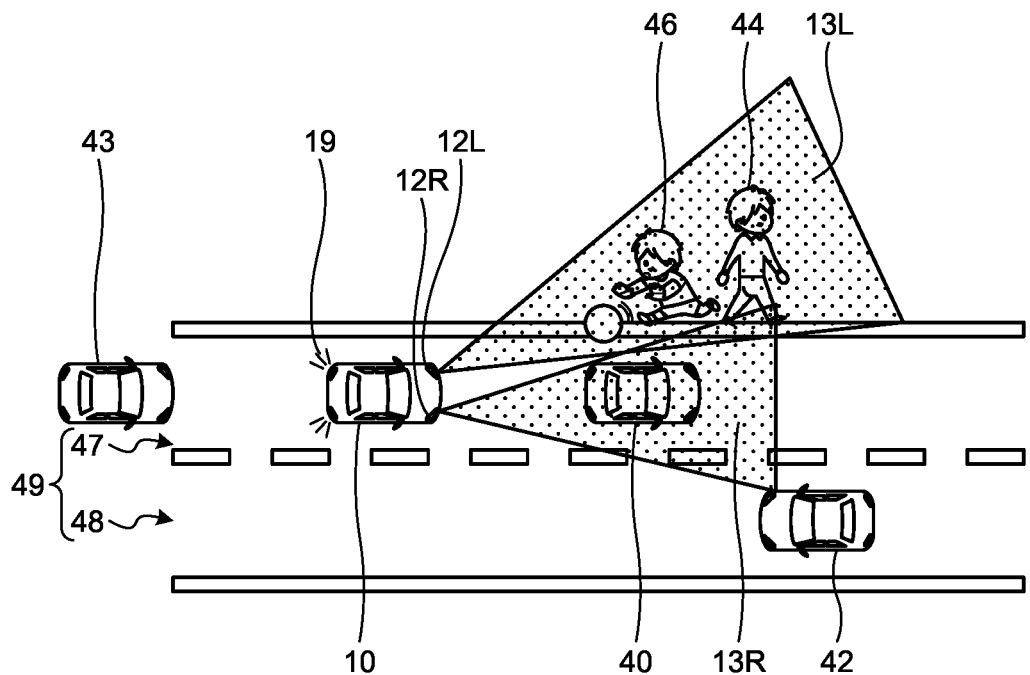
FIG. 14 is a diagram illustrating a specific example in which attention is called by an attention calling device according to a second embodiment.

An operation example of an attention calling device 50b according to the second embodiment of the present disclosure will be described with reference to FIG. 14. FIG. 14 is a diagram illustrating a specific example in which attention is called by the attention calling device according to the second embodiment.

The attention calling device 50b has a function of calling attention by controlling the light distribution of the headlights 12 in the same manner as described in the first embodiment. In addition, when the attention calling device 50b calls attention of the driver of the vehicle 10, if there is a following vehicle 43 (following moving object) traveling in the same direction as the vehicle 10 at a position within a predetermined distance behind the vehicle 10, the attention calling device 50b calls attention of an occupant of the following vehicle 43. Note that the attention of the occupant of the following vehicle 43 can be called by, for example, blinking a hazard lamp in a rear direction of the vehicle 10.

Hardware Configuration of Attention Calling Device

Figure 15:
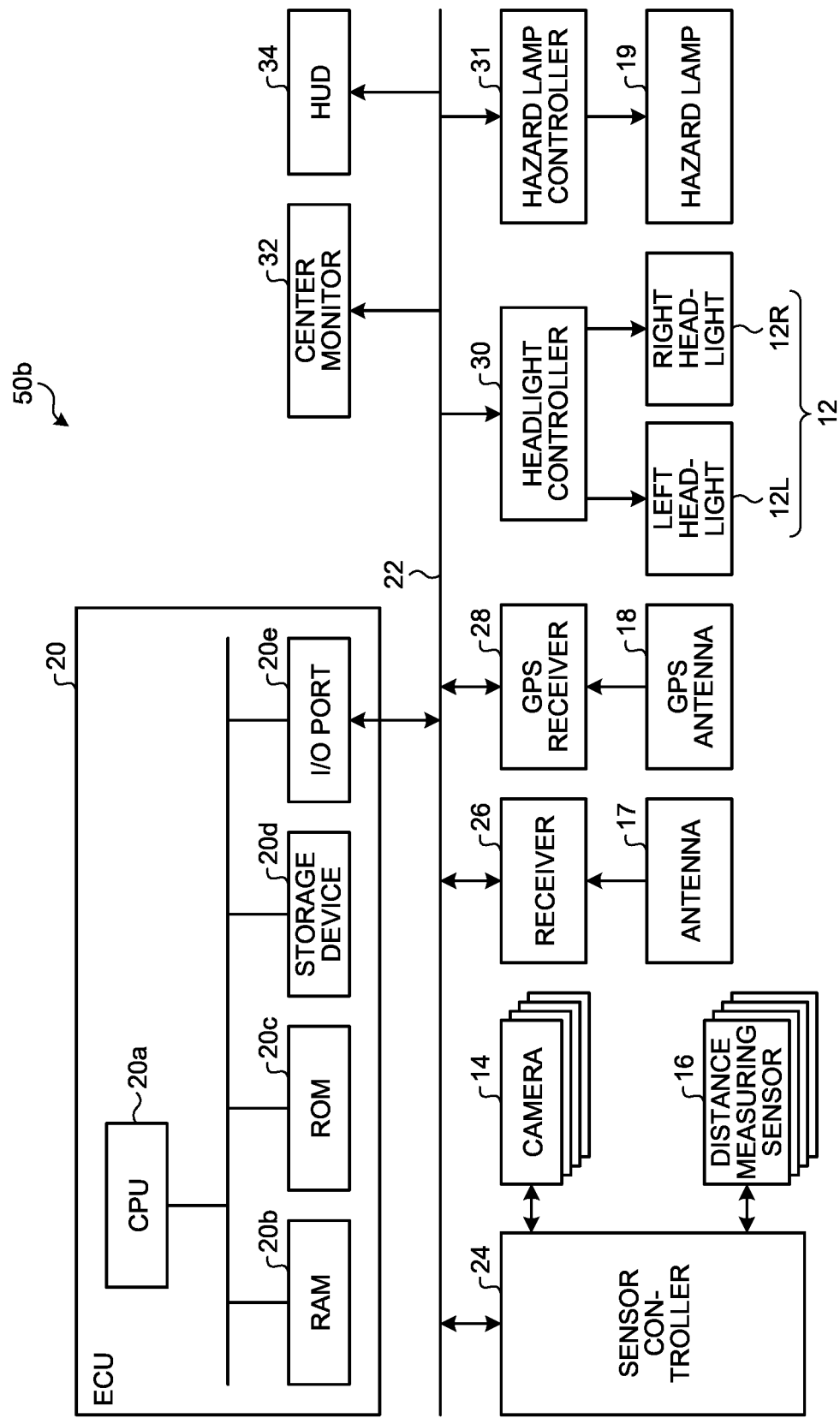
FIG. 15 is a hardware block diagram illustrating an example of a hardware configuration of the attention calling device according to the second embodiment.

Next, a hardware configuration of the attention calling device 50b will be described with reference to FIG. 15. FIG. 15 is a hardware block diagram illustrating an example of the hardware configuration of the attention calling device according to the second embodiment.

The attention calling device 50b has a configuration in which hazard lamps 19 and a hazard lamp controller 31 are added to the hardware configuration (see FIG. 7) of the attention calling device 50a described in the first embodiment.

The hazard lamps 19 are a pair of lamps provided at a front end and a rear end of the vehicle, respectively.

The hazard lamp controller 31 performs blinking control of the hazard lamps 19 based on an instruction from the ECU 20. In a case where there is an obstacle particularly requiring attention in the traveling direction of the vehicle 10, the vehicle 10 is likely to perform sudden braking. Therefore, the attention calling device 50b calls attention of the vehicle 43 (see FIG. 3) following the vehicle 10 by blinking the hazard lamp 19 according to an instruction from the hazard lamp controller 31.

Functional Configuration of Attention Calling Device

Figure 16:
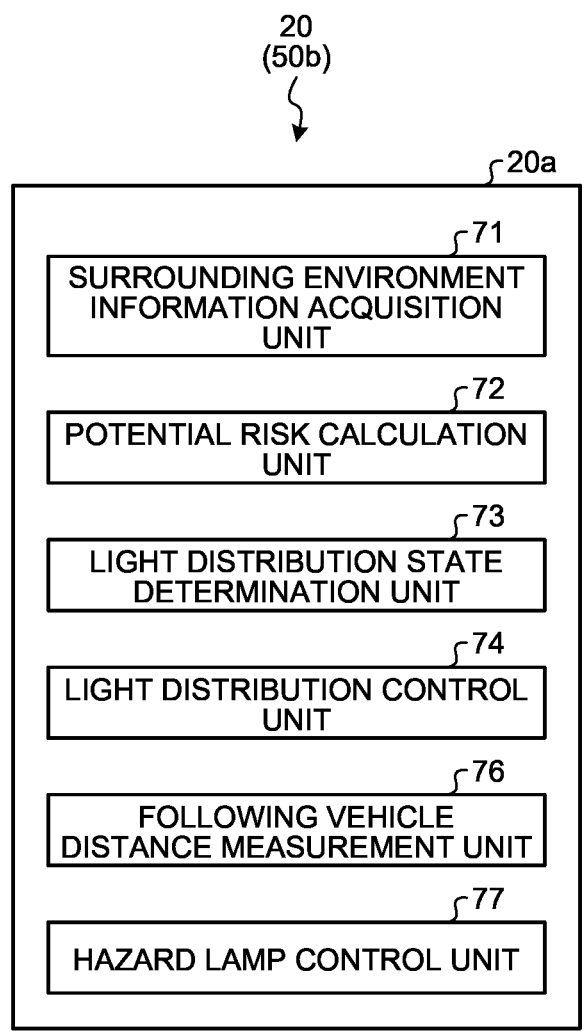
FIG. 16 is a functional block diagram illustrating an example of a functional configuration of the attention calling device according to the second embodiment.

Next, a functional configuration of the attention calling device 50b will be described with reference to FIG. 16. FIG. 16 is a functional block diagram illustrating an example of the functional configuration of the attention calling device according to the second embodiment.

The ECU 20 of the attention calling device 50b causes the RAM 20b to develop a control program, which is stored in the ECU 20, and causes the CPU 20a to operate the control program, thereby implementing a surrounding environment information acquisition unit 71, a potential risk calculation unit 72, a light distribution state determination unit 73, a light distribution control unit 74, a following vehicle distance measurement unit 76, and a hazard lamp control unit 77 illustrated in FIG. 16 as functional units.

Among them, the surrounding environment information acquisition unit 71, the potential risk calculation unit 72, the light distribution state determination unit 73, and the light distribution control unit 74 have the same functions as those described in the first embodiment.

The following vehicle distance measurement unit 76 measures a distance from the vehicle 10 to the following vehicle 43 using a distance measuring sensor 16 installed on the rear of the vehicle 10. The following vehicle distance measurement unit 76 determines whether there is a following vehicle 43 traveling after the vehicle 10 behind the vehicle 10.

If the potential risk R calculated by the potential risk calculation unit 72 is equal to or greater than a predetermined value, and the distance from the vehicle 10 to the following vehicle 43 measured by the following vehicle distance measurement unit 76 is equal to or smaller than a predetermined distance, the hazard lamp control unit 77 determines that there is a following vehicle 43 traveling after the vehicle 10 behind the vehicle 10 and it is required to call attention of the following vehicle 43. Then, if it is determined that it is required to call attention of the following vehicle 43, the hazard lamp control unit 77 blinks the hazard lamp 19. In addition, if the distance from the vehicle 10 to the following vehicle 43 measured by the following vehicle distance measurement unit 76 exceeds the predetermined distance, the hazard lamp control unit 77 does not blink the hazard lamp 19. Note that the hazard lamp control unit 77 is an example of an information presentation unit in the present disclosure, similarly to the light distribution control unit 74 described in the first embodiment.

The above-described predetermined distance, that is, a threshold value of the distance from the vehicle 10 to the following vehicle 43, is preferably set based on a speed of the vehicle 10, a speed of the following vehicle 43, and an idle running distance at the speed. That is, a human requires a predetermined time called a reaction time from sensing danger to taking some action. The idle running distance is a distance by which the following vehicle 43 travels during the reaction time. Therefore, the higher the speed of the following vehicle 43, the longer the idle running distance. The threshold value of the distance from the vehicle 10 to the following vehicle 43 is set so that the following vehicle 43 can stop without contacting the vehicle 10 in a state where the idle running distance is considered, for example, in a case where it is assumed that the vehicle 10 performs sudden braking.

Flow of Process Performed by Attention Calling Device

Figure 17:
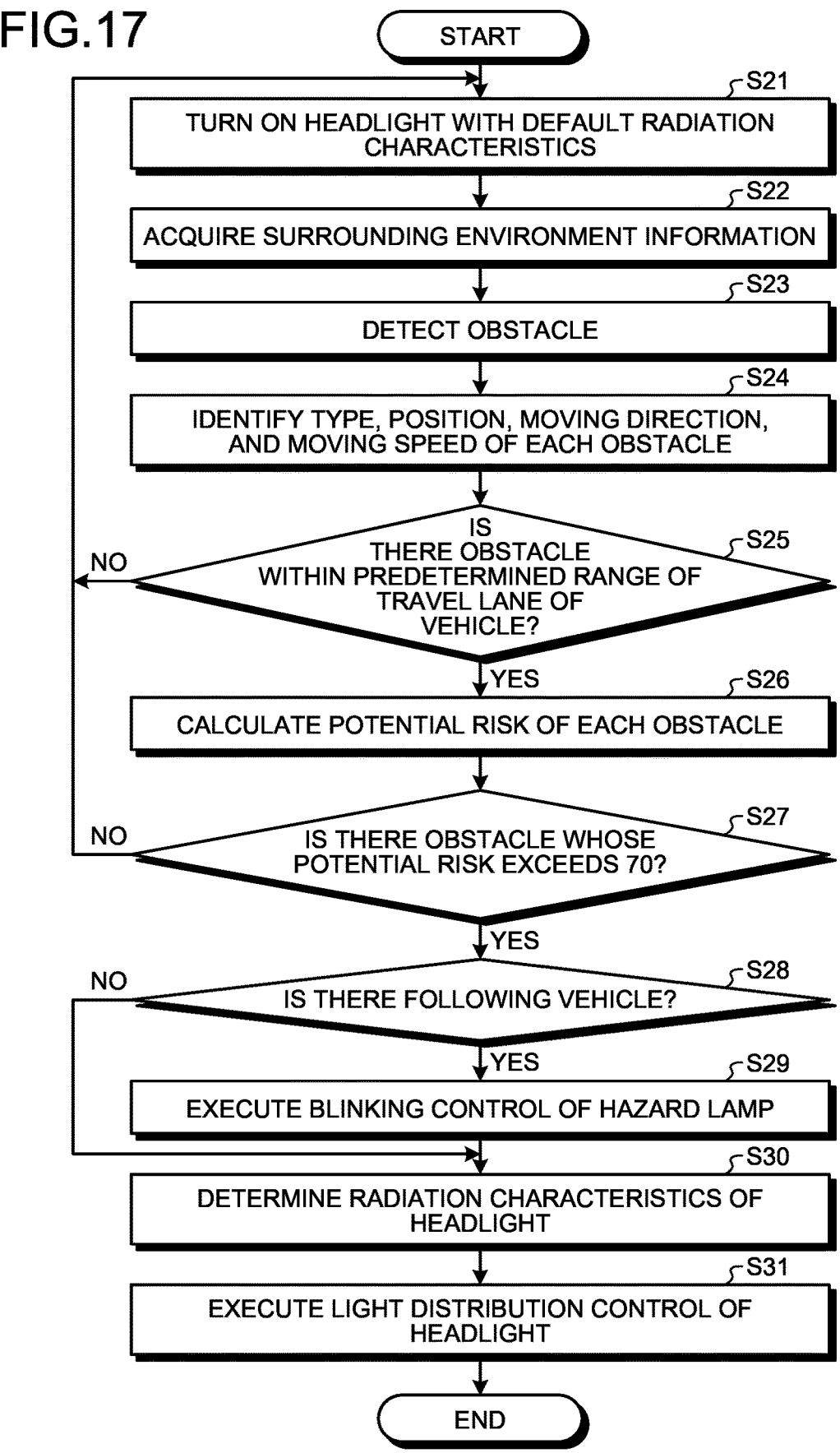
FIG. 17 is a flowchart illustrating an example of a flow of a process performed by the attention calling device according to the second embodiment.

Next, a flow of a process performed by the attention calling device 50b will be described with reference to FIG. 17. FIG. 17 is a flowchart illustrating an example of the flow of the process performed by the attention calling device according to the second embodiment.

Since the flow of the process performed in Steps S21 to S26 of FIG. 17 is the same as that of the process performed by the attention calling device 50a described in the first embodiment, the description thereof will be omitted.

Following Step S26 in FIG. 17, the potential risk calculation unit 72 determines whether there is an obstacle whose potential risk R exceeds a predetermined value (e.g., 70) (Step S27). When it is determined that there is an obstacle whose potential risk R exceeds the predetermined value (Step S27: Yes), the process proceeds to Step S28. On the other hand, when it is not determined that there is an obstacle whose potential risk R exceeds the predetermined value (Step S27: No), the process returns to Step S21.

When it is determined in Step S27 that there is an obstacle whose potential risk R exceeds the predetermined value, the following vehicle distance measurement unit 76 determines whether there is a following vehicle 43 behind the vehicle 10 based on the distance from the vehicle 10 to the following vehicle 43 (Step S28). When it is determined that there is a following vehicle 43 behind the vehicle 10 (Step S28: Yes), the process proceeds to Step S29. On the other hand, when it is not determined that there is a following vehicle 43 behind the vehicle 10 (Step S28: No), the process proceeds to Step S30.

When it is determined in Step S28 that there is a following vehicle 43 behind the vehicle 10, the hazard lamp control unit 77 executes blinking control to blink the hazard lamp 19 of the vehicle 10 (Step S29).

Subsequently, the light distribution state determination unit 73 determines radiation characteristics of the headlights 12 (Step S30).

The light distribution control unit 74 independently controls radiation characteristics of the left headlight 12L and the right headlight 12R by controlling the headlight controller 30, such that the radiation characteristics determined by the light distribution state determination unit 73 in Step S30 are realized. Thereafter, the attention calling device 50b ends the process of FIG. 17.

Note that the blinking of the hazard lamp 19 performed in Step S29 is manually canceled by the driver of the vehicle 10 after safety is ensured by stopping the vehicle 10, avoiding the obstacle, or the like. Alternatively, the hazard lamp control unit 77 may automatically cancel the blinking of the hazard lamp 19, for example, when it is determined that the potential risk R is 30 or less, that is, there is no obstacle or no attention needs to be paid even though there is an obstacle.

In addition, although the attention calling device 50b is configured to perform the blinking control of the hazard lamp 19 and the light distribution control of the headlights 12 when an obstacle having a potential risk R exceeding 70 is detected in the flowchart of FIG. 17, the attention calling method is not limited thereto. For example, while the process of FIG. 17 may be performed when an obstacle having a potential risk R exceeding 70 is detected, only the light distribution control of the headlights 12 may be performed without performing the blinking control of the hazard lamp 19 when an obstacle having a potential risk R between 30 and 70 is detected.

Effect of Second Embodiment

As described above, in the attention calling device 50b according to the second embodiment, the surrounding environment information acquisition unit 71 (acquisition unit) acquires information regarding obstacles around the vehicle 10 (moving object) detected by the sensors included in the vehicle 10. The potential risk calculation unit 72 (calculation unit) calculates respective potential risks R of the obstacles around the vehicle 10 based on the information regarding the obstacles acquired by the surrounding environment information acquisition unit 71 and the moving state of the vehicle 10. Then, if the potential risk R calculated by the potential risk calculation unit 72 exceeds a predetermined value and there is a following vehicle 43 (following moving object) traveling after the vehicle 10, the hazard lamp control unit 77 (information presentation unit) presents information for calling attention to an occupant of the following vehicle 43. Therefore, when there is an obstacle having a high potential risk R in the moving direction of the vehicle 10, it is possible to appropriately call attention of the occupant of the vehicle 43 following the vehicle 10.

In addition, in the attention calling device 50b according to the second embodiment, the hazard lamp control unit 77 (information presentation unit) blinks the hazard lamp 19 at a rear portion of the vehicle 10. Therefore, by blinking the hazard lamp 19 that is easy to visually recognize, the attention of the occupant of the following vehicle 43 can be appropriately called. In addition, there is no need to secure an installation space for utilizing conventional components of the vehicle. In addition, an increase in cost is also suppressed.

In addition, in the attention calling device 50*b* according to the second embodiment, the light distribution control unit 74 (information presentation unit) presents to the occupant of the vehicle 10 (moving object) information for calling attention to an obstacle whose potential risk R exceeds a predetermined value, based on the respective potential risks R of the obstacles calculated by the potential risk calculation unit 72. Therefore, the attention of the occupant of the vehicle 10 can also be appropriately called.

In addition, in the attention calling device 50*b* according to the second embodiment, when the distance from the vehicle 10 (moving object) to the following vehicle 43 (following moving object) exceeds a predetermined distance, the hazard lamp control unit 77 (information presentation unit) does not present information for calling attention to the occupant of the following vehicle 43. Therefore, it is possible to prevent unnecessary attention from being called.

In addition, in the attention calling device 50*b* according to the second embodiment, the information regarding obstacles includes at least positions of the obstacles. Therefore, since moving directions and moving speeds of obstacles can be estimated by obtaining temporal changes in position of the obstacles, an obstacle having a high potential risk R can be detected with a small amount of data.

In addition, in the attention calling device 50*b* according to the second embodiment, the information regarding obstacles includes types, positions, moving directions, and moving speeds of the obstacles. Therefore, an obstacle having a high potential risk R, like the rushing-out pedestrian 46, can also be reliably detected.

Modification of Second Embodiment

The attention calling device 50*b* may call attention of the occupant of the vehicle 10 using a method other than the light distribution control of the headlights 12.

Specifically, a position of an obstacle particularly requiring attention may be displayed on the center monitor 32 or the display area 34*a* of the HUD 34 provided in the vehicle 10 in the same manner as described in the modification of the first embodiment (see FIGS. 10, 11, and 12).

Functional Configuration of Modification of Second Embodiment

Figure 18:
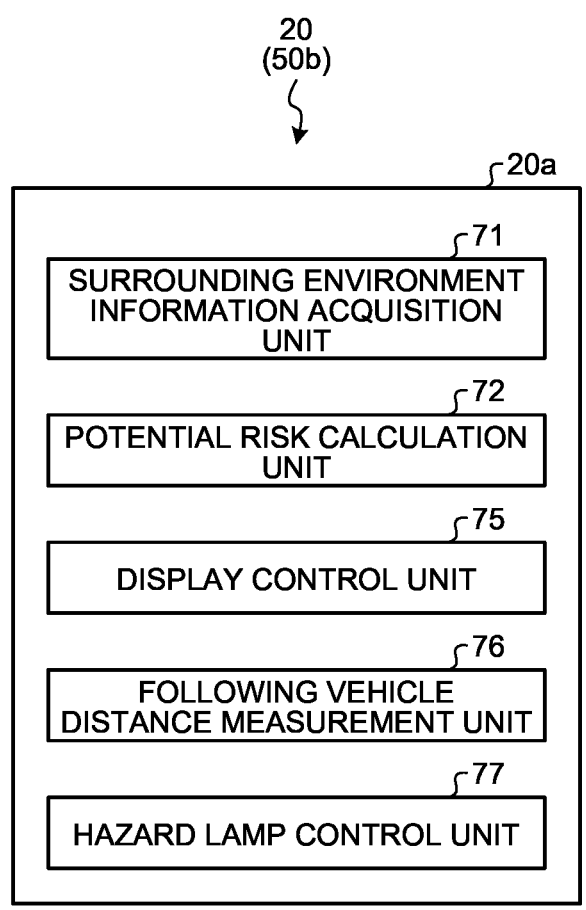
FIG. 18 is a functional block diagram illustrating an example of a functional configuration of an attention calling device according to a modification of the second embodiment.

A functional configuration of the attention calling device 50*b* according to the modification of the second embodiment will be described with reference to FIG. 18. FIG. 18 is a functional block diagram illustrating an example of the functional configuration of the attention calling device according to the modification of the second embodiment.

The ECU 20 of the attention calling device 50*b* causes the RAM 20*b* to develop a control program, which is stored in the ECU 20, and causes the CPU 20*a* to operate the control program, thereby implementing a surrounding environment information acquisition unit 71, a potential risk calculation unit 72, a display control unit 75, a following vehicle distance measurement unit 76, and a hazard lamp control unit 77 illustrated in FIG. 18 as functional units.

Since the functions of the surrounding environment information acquisition unit 71, the potential risk calculation unit 72, the following vehicle distance measurement unit 76, and the hazard lamp control unit 77 are as described above (see FIG. 16), the description thereof will be omitted.

In addition, since the function of the display control unit 75 is as described above (see FIG. 13), the description thereof will be omitted.

Note that, although a function of controlling light distribution of the headlights 12 of the vehicle 10 is not described in the functional block diagram of FIG. 18, the light distribution state determination unit 73 and the light distribution control unit 74 illustrated in FIG. 16 may be further included in the functional block diagram of FIG. 18.

For example, the present disclosure can also have the following configurations.

(1)

An attention calling device comprising: an acquisition unit that acquires information regarding obstacles around a moving object detected by sensors included in the moving object; a calculation unit that calculates a potential risk that is a degree to which attention needs to be paid for each of the obstacles around the moving object, based on the information regarding the obstacles acquired by the acquisition unit and a moving state of the moving object; and an information presentation unit that presents information for calling attention to an occupant of a following moving object, if the potential risk calculated by the calculation unit exceeds a predetermined value and the following moving object travels after the moving object.

(2)

The attention calling device according to (1), in which the information presentation unit blinks a hazard lamp at a rear portion of the moving object.

(3)

The attention calling device according to (1) or (2), in which the information presentation unit presents information for calling attention to an obstacle whose potential risk exceeds the predetermined value to an occupant of the moving object, based on the potential risk of each of the obstacles calculated by the calculation unit.

(4)

The attention calling device according to any one of (1) to (3), in which when a distance from the moving object to the following moving object exceeds a predetermined distance, the information presentation unit does not present information for calling attention to the occupant of the following moving object.

(5)

The attention calling device according to any one of (1) to (4), in which the information regarding the obstacles includes at least positions of the obstacles.

(6)

The attention calling device according to any one of (1) to (4), in which the information regarding the obstacles includes types, positions, moving directions, and moving speeds of the obstacles.

(7)

An attention calling method comprising: an acquisition step of acquiring information regarding obstacles around a moving object detected by sensors included in the moving object; a calculation step of calculating a potential risk that is a degree to which attention needs to be paid for each of the obstacles around the moving object, based on the information regarding the obstacles acquired in the acquisition step and a moving state of the moving object; and an information presentation step of presenting information for calling attention to an occupant of a following moving object, if the potential risk calculated in the calculation step exceeds a predetermined value and the following moving object travels after the moving object.

The attention calling device according to the present disclosure can appropriately call attention of the occupant of the moving object when there is an obstacle having a high potential risk in the moving direction of the moving object.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An attention calling device, comprising: a memory; and a hardware processor coupled to the memory, wherein the hardware processor is configured to:
   acquire information regarding obstacles around a moving object, the obstacles being detected by a sensor included in the moving object;
   calculate a potential risk that is a degree to which attention needs to be paid for each of the obstacles around the moving object, based on the information regarding the obstacles thus acquired and a moving state of the moving object;
   present, to an occupant of the moving object, information for calling attention to at least one obstacle having a potential risk exceeding a predetermined value, based on the potential risk of each of the obstacles;
   and determine radiation characteristics of at least one headlight of the moving object to cover the obstacle having the potential risk exceeding the predetermined value, wherein the hardware processor is further configured to: determine whether a following moving object is traveling in a same direction as the moving object and at a position within a predetermined distance behind the moving object; and present, to a second occupant of the following moving object, second information for calling attention to the obstacle having the potential risk exceeding the predetermined value in response to the following moving object traveling in the same direction and being at the position within the predetermined distance.

2. The attention calling device according to claim 1, wherein
   the hardware processor is configured to control the radiation characteristics of the headlight of the moving object according to a position of the obstacle having the potential risk exceeding the predetermined value.

3. The attention calling device according to claim 2, wherein
   the hardware processor is configured to direct a radiation direction of the headlight in a direction toward the obstacle having the potential risk exceeding the predetermined value.

4. The attention calling device according to claim 2, wherein
   the hardware processor is configured to change a light distribution of the headlight such that illuminance is increased in a direction toward the obstacle having the potential risk exceeding the predetermined value.

5. The attention calling device according to claim 1, wherein
   the hardware processor is configured to display a position of the obstacle having the potential risk exceeding the predetermined value on a display device included in the moving object.

6. The attention calling device according to claim 5, wherein
   the display device is an in-vehicle monitor.

7. The attention calling device according to claim 5, wherein
   the display device is a head-up display.

8. The attention calling device according to claim 1, wherein
   the information regarding the obstacles includes at least positions of the obstacles.

9. The attention calling device according to claim 1, wherein
   the information regarding the obstacles includes types, positions, moving directions, and moving speeds of the obstacles.

10. The attention calling device according to claim 1, wherein
    the moving state of the moving object includes at least a moving speed and a moving direction of the moving object.

11. The attention calling device according to claim 1, wherein
    the hardware processor is further configured to:
    determine an illumination area of the headlight based at least on the radiation characteristics.

12. The attention calling device according to claim 11, wherein
    the hardware processor determines the illumination area of the headlight based on the radiation characteristics and an area of a travel lane on which the moving object is traveling.

13. The attention calling device according to claim 1, wherein the second information for calling attention to the obstacle having the potential risk exceeding the predetermined value is presented to the second occupant by blinking a lamp at a rear portion of the moving object.

14. The attention calling device according to claim 1, wherein when a distance from the moving object to the following moving object exceeds the predetermined distance, the hardware processor does not present the second information for calling attention to the second occupant of the following moving object.

15. The attention calling device according to claim 1, wherein the information regarding the obstacles includes at least positions of the obstacles.

16. The attention calling device according to claim 1, wherein the information regarding the obstacles includes types, positions, moving directions, and moving speeds of the obstacles.

17. The attention calling device according to claim 1, wherein
    the hardware processor presents the information for calling attention to the obstacle having the potential risk exceeding the predetermined value to the occupant of the moving object, based on the potential risk of each of the obstacles calculated by the hardware processor.

18. An attention calling method, executed by a hardware processor, the attention calling method comprising:
    acquiring information regarding obstacles around a moving object, the obstacles being detected by a sensor included in the moving object; calculating a potential risk that is a degree to which attention needs to be paid for each of the obstacles around the moving object, based on the information regarding the obstacles acquired at the acquiring and a moving state of the moving object;

presenting, to an occupant of the moving object, information for calling attention to at least one obstacle having a potential risk exceeding a predetermined value, based on the potential risk of each of the obstacles calculated at the calculating;

determining radiation characteristics of at least one headlight of the moving object to cover the at least one obstacle having the potential risk exceeding the predetermined value;

determining whether a following moving object is traveling in a same direction as the moving object and at a position within a predetermined distance behind the moving object; and presenting, to a second occupant of the following moving object, second information for calling attention to the obstacle having the potential risk exceeding the predetermined value in response to the following moving object traveling in the same direction and being at the position within the predetermined distance.

19. A non-transitory computer-readable medium on which an executable program is recorded, the program instructing a computer to carry out:

acquiring information regarding obstacles around a moving object, the obstacles being detected by a sensor included in the moving object; calculating a potential risk that is a degree to which attention needs to be paid for each of the obstacles around the moving object, based on the information regarding the obstacles acquired at the acquiring and a moving state of the moving object;

presenting, to an occupant of the moving object, information for calling attention to at least one obstacle having a potential risk exceeding a predetermined value, based on the potential risk of each of the obstacles calculated at the calculating;

determining radiation characteristics of at least one headlight of the moving object to cover the at least one obstacle having the potential risk exceeding the predetermined value;

determining whether a following moving object is traveling in a same direction as the moving object and at a position within a predetermined distance behind the moving object; and presenting, to a second occupant of the following moving object, second information for calling attention to the obstacle having the potential risk exceeding the predetermined value in response to the following moving object traveling in the same direction and being at the position within the predetermined distance.

* * * * *